(12) United States Patent
Kolmanovsky et al.

(10) Patent No.: US 8,141,358 B2
(45) Date of Patent: Mar. 27, 2012

(54) METHOD FOR CONTROLLING CYLINDER AIR CHARGE FOR A TURBO CHARGED ENGINE HAVING VARIABLE EVENT VALVE ACTUATORS

(75) Inventors: Ilya Kolmanovsky, Novi, MI (US); Alex Gibson, Ann Arbor, MI (US); Donald Lewis, Vancouver, WA (US)

(73) Assignee: Ford Global Technologies, LLC, Dearborn, MI (US)

( * ) Notice: Subject to any disclaimer, the term of this patent is extended or adjusted under 35 U.S.C. 154(b) by 236 days.

(21) Appl. No.: 12/604,713

(22) Filed: Oct. 23, 2009

(65) Prior Publication Data

US 2010/0078001 A1 Apr. 1, 2010

Related U.S. Application Data

(63) Continuation of application No. 11/397,995, filed on Apr. 5, 2006, now Pat. No. 7,621,126.

(51) Int. Cl.
*F02B 33/44* (2006.01)
*F01L 1/34* (2006.01)
*F01L 9/02* (2006.01)
*F02D 11/10* (2006.01)
*F02P 5/00* (2006.01)

(52) U.S. Cl. .......... 60/605.1; 123/90.15; 123/90.11; 123/399; 123/406.23; 123/406.65

(58) Field of Classification Search .......... 60/605.1; 123/399, 406.65, 406.23, 90.15, 90.11; *F02B 27/00*
See application file for complete search history.

(56) References Cited

U.S. PATENT DOCUMENTS

| 4,646,697 | A | * | 3/1987 | Grob et al. | 123/406.23 |
|---|---|---|---|---|---|
| 4,676,215 | A | * | 6/1987 | Blocher et al. | 123/406.65 |
| 5,271,229 | A | | 12/1993 | Clarke et al. | |
| 5,277,029 | A | | 1/1994 | Kidokoro et al. | |
| 5,421,296 | A | | 6/1995 | Hitomi et al. | |
| 5,706,782 | A | * | 1/1998 | Kurihara | 123/399 |
| 5,765,514 | A | | 6/1998 | Sono et al. | |
| 5,845,495 | A | | 12/1998 | Schray et al. | |
| 6,039,026 | A | | 3/2000 | Shiraishi et al. | |
| 6,073,596 | A | | 6/2000 | Kemper | |
| 6,167,703 | B1 | | 1/2001 | Rumez et al. | |
| 6,182,636 | B1 | * | 2/2001 | Russell et al. | 123/399 |
| 6,219,611 | B1 | | 4/2001 | Russell | |
| 6,250,283 | B1 | | 6/2001 | Russell et al. | |
| 6,279,523 | B1 | | 8/2001 | Iida et al. | |
| 6,338,250 | B1 | | 1/2002 | MacKay | |
| 6,354,563 | B1 | | 3/2002 | Yoeda et al. | |
| 6,363,721 | B1 | | 4/2002 | Prenninger et al. | |
| 6,378,305 | B1 | | 4/2002 | Sumser et al. | |
| 6,397,814 | B1 | | 6/2002 | Nagaishi et al. | |

(Continued)

FOREIGN PATENT DOCUMENTS

DE 19846111 A1 * 4/2000

*Primary Examiner* — Thai Ba Trieu
(74) *Attorney, Agent, or Firm* — Allan J. Lippa; Alleman Hall McCoy Russell & Tuttle LLP

(57) ABSTRACT

A method for controlling cylinder air charge of an engine having a compressor is presented. In one example, the description includes a method for coordinating the control of the throttle, turbo charger, and valves such that the desired cylinder air charge may be achieved while engine pumping work may be decreased.

15 Claims, 20 Drawing Sheets

U.S. PATENT DOCUMENTS

| | | |
|---|---|---|
| 6,434,938 B1 | 8/2002 | Sun et al. |
| 6,460,337 B1 | 10/2002 | Olofsson |
| 6,470,869 B1 | 10/2002 | Russell et al. |
| 6,477,993 B1 | 11/2002 | Katsumata et al. |
| 6,502,543 B1 | 1/2003 | Arai et al. |
| 6,560,527 B1 | 5/2003 | Russell et al. |
| 6,574,961 B2 | 6/2003 | Shiraishi et al. |
| 6,658,847 B2 | 12/2003 | Shirakawa |
| 6,705,284 B2 | 3/2004 | Russell et al. |
| 6,712,041 B1 | 3/2004 | Russell et al. |
| 6,834,627 B2 | 12/2004 | Hiraku et al. |
| 6,938,598 B1 | 9/2005 | Lewis et al. |
| 6,938,614 B2 | 9/2005 | Criddle et al. |
| 6,978,764 B1 | 12/2005 | Russell et al. |
| 7,011,075 B2 | 3/2006 | Lewis |
| 7,017,539 B2 | 3/2006 | Lewis et al. |
| 7,021,289 B2 | 4/2006 | Lewis et al. |
| 7,028,650 B2 | 4/2006 | Lewis et al. |
| 7,031,821 B2 | 4/2006 | Lewis et al. |
| 7,032,381 B2 | 4/2006 | Shiraishi et al. |
| 7,032,545 B2 | 4/2006 | Lewis et al. |
| 7,047,126 B2 | 5/2006 | Lewis |
| 7,055,483 B2 | 6/2006 | Lewis et al. |
| 7,063,062 B2 | 6/2006 | Lewis et al. |
| 7,066,121 B2 | 6/2006 | Michelini et al. |
| 7,107,946 B2 | 9/2006 | Lewis et al. |
| 7,107,947 B2 | 9/2006 | Lewis et al. |
| 7,111,612 B2 | 9/2006 | Michelini et al. |
| 7,121,262 B2 | 10/2006 | Michelini et al. |
| 7,128,043 B2 | 10/2006 | Lewis et al. |
| 7,128,687 B2 | 10/2006 | Lewis |
| 7,140,355 B2 | 11/2006 | Michelini et al. |
| 7,165,391 B2 | 1/2007 | Lewis |
| 7,165,520 B2 | 1/2007 | Lewis et al. |
| 7,174,252 B1 | 2/2007 | Kolmanovsky et al. |
| 7,184,879 B1 | 2/2007 | Lewis |
| 7,194,993 B2 | 3/2007 | Lewis et al. |
| 7,234,435 B2 | 6/2007 | Lewis et al. |
| 7,252,054 B2 | 8/2007 | Weber et al. |
| 7,275,516 B1 | 10/2007 | Cunningham et al. |
| 7,383,820 B2 | 6/2008 | Lewis et al. |
| 7,458,346 B2 | 12/2008 | Gibson |
| 7,469,667 B2 | 12/2008 | Leone et al. |
| 7,555,896 B2 | 7/2009 | Lewis et al. |
| 7,562,530 B2 | 7/2009 | Kolmanovsky |
| 7,621,126 B2 | 11/2009 | Kolmanovsky et al. |
| 7,640,744 B2 * | 1/2010 | Rollinger et al. ............ 60/605.1 |
| 2003/0221643 A1 | 12/2003 | Kurihara |
| 2004/0006985 A1 | 1/2004 | Wild et al. |
| 2004/0006986 A1 | 1/2004 | Baeuerle |
| 2004/0115064 A1 | 6/2004 | Bleile et al. |
| 2004/0237949 A1 | 12/2004 | Yasui et al. |
| 2005/0034701 A1 | 2/2005 | Betz et al. |
| 2005/0092272 A1 | 5/2005 | Shindou |
| 2005/0166895 A1 | 8/2005 | Yoshizawa et al. |
| 2006/0254564 A1 | 11/2006 | Lewis et al. |

* cited by examiner

METHOD FOR CONTROLLING CYLINDER AIR CHARGE FOR A TURBO CHARGED ENGINE HAVING VARIABLE EVENT VALVE ACTUATORS

CROSS REFERENCE TO RELATED APPLICATION

The present application is a continuation of U.S. patent application Ser. No. 11/397,995, filed Apr. 5, 2006, entitled "Method for Controlling Cylinder Air Charge for a Turbo Charged Engine Having Variable Event Valve Actuators", the entire contents of each of which are incorporated herein by reference.

FIELD

The present description relates to a method for controlling the cylinder air charge of an internal combustion engine having a turbo charger and variable event valve actuators.

BACKGROUND

One method to operate an internal combustion engine having a turbo charger and variable event valve actuators is presented in U.S. Pat. No. 5,271,229. This method presents a way to improve the response of a turbo charger by actively controlling variable event actuators. Specifically, the method provides for a controlling the intake valves of a selected subset of combustion chambers to be initiated during every intake and expansion stroke permitting flow of air into the combustion chambers. The method also provides for controlling the exhaust valves of the selected subset of cylinders so that they are initiated during every compression and exhaust stroke to increase the pumping of air from the combustion chambers and thereby increase flow through the turbo charger turbine. In other words, the cylinders may be operated in a two stroke mode to increase the flow to the turbine.

The above-mentioned method can also have several disadvantages. For example, during engine acceleration the method may allow the intake manifold pressure to be pumped down before the turbo charger can supply a sufficient amount of air to maintain or increase the manifold pressure. This may make the actual engine torque vary and/or decrease when the desired engine torque increases or is above the actual engine torque. In addition, the method may increase engine emissions or fuel consumption while operating in a two stroke mode.

The inventors herein have recognized the above-mentioned disadvantages and have developed a method to control an engine having variable event valve timing and a turbo charger.

SUMMARY

One embodiment of the present description includes a method for controlling an internal combustion engine, the method comprising: adjusting an actuator downstream of a throttle to vary the air charge of a cylinder as the air flowing out of a turbo charger compressor varies. This method overcomes at least some of the limitations of the previously mentioned methods.

Variable valve timing may be used to control engine torque of a turbo charged engine so that engine torque may be increased monotonically during engine acceleration. In other words, engine air charge can be adjusted as the flow capacity of the turbo charger changes to improve engine torque response. Further, under certain conditions, the compressor of a turbo charger can act to limit the amount of air entering an engine, when the speed of the turbo charge compressor is low, for example. This can result in a temporary reduction of intake manifold pressure and in a lower torque output capacity for an engine. This may occur because the engine pumping capacity can exceed the turbo charger pumping capacity. However, the present description provides for adjusting valve timing so that there is less variation in intake manifold pressure. Consequently, it is possible to provide better regulation of engine torque, cylinder air-fuel ratio, and engine emissions.

The present description may provide several advantages. Specifically, engine torque reductions and/or fluctuations may be reduced or avoided during periods when the engine torque demand is changing. Further, the method may be used to better match turbo charger operating constraints with engine operating constraints so that vehicle drivability can be improved. Further still, engine air-fuel control may be improved by reducing the variation of intake manifold pressure.

The above advantages and other advantages and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
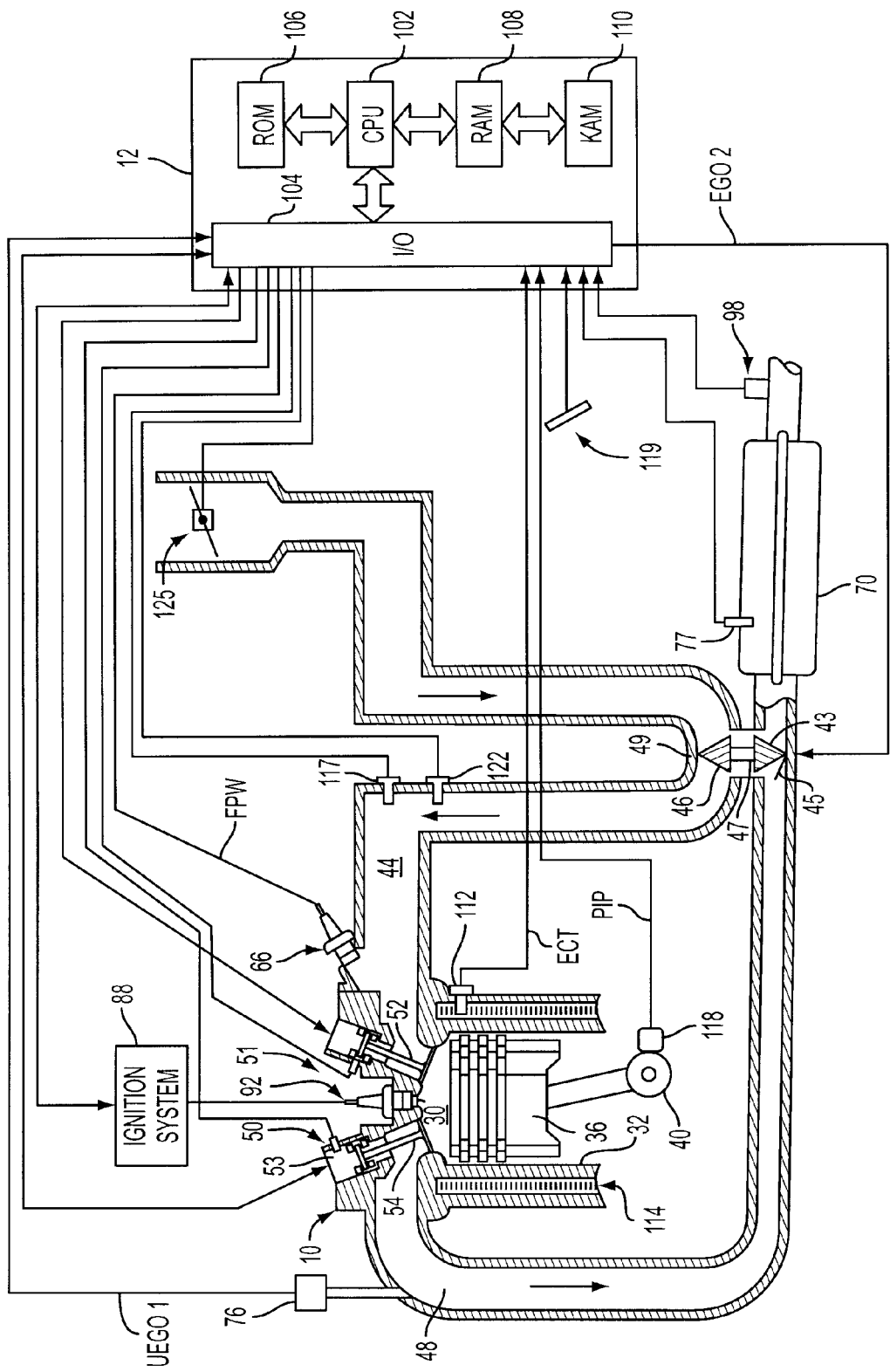
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston positioned therein and connected to crankshaft 40. Combustion chamber 30 is known communicating with intake manifold 44 and exhaust manifold 48 via respective intake valve 52 an exhaust valve 54. Each intake and exhaust valve is operated by an electromechanically controlled valve coil and armature assembly 53. Alternatively, the intake 52 or exhaust 54 valve may be mechanically actuated. Armature temperature is determined by temperature sensor 51. Valve position is determined by position sensor 50. Valve position may be determined by linear variable displacement, discrete, or optical transducers or from actuator current measurements. In an alternative example, each valve actuator for valves 52 and 54 has a position sensor and a temperature sensor. In yet another alternative example, armature temperature may be determined from actuator power consumption since resistive losses can scale with temperature.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Turbo charger 49 is shown in communication with exhaust manifold 48 and intake manifold 44. Fresh air may be inducted past throttle body 125, compressed by turbo charger compressor 46, and directed to intake manifold 44. Alternatively, throttle body 125 may be located downstream of turbo charger compressor 46. If the throttle body is located downstream of the compressor, pressure and temperature transducers may be installed in the intake manifold as well as between the compressor and the throttle (i.e., boost pressure and temperature).

Turbo charger turbine 43 is connected to turbo charger compressor 46 by shaft 47. During operation exhaust gases can flow from exhaust manifold 48 to turbo charger 49, where expanding exhaust gases can rotate exhaust turbine 43 and compressor 46. Exhaust gases are directed from turbine 43 to catalyst 70 for processing. Turbo charger efficiency may be adjusted by varying the vane position actuator 45 of the variable geometry turbo charger. Alternatively, the turbo charger may be a waste gate type of turbo charger.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to an accelerator pedal; a measurement of engine manifold pressure (MAP) from pressure sensor 122 coupled to intake manifold 44; a measurement (ACT) of engine air amount temperature or manifold temperature from temperature sensor 117; and engine position from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined. The controller may determine the amount of overlap between intake and exhaust valves as well as fuel timing, spark timing, and throttle position.

The engine described in FIG. 1 may be the primary means of generating motive force in a vehicle or it may be part of a vehicle having more than one means for generating motive force, a hybrid vehicle for example. The engine may generate wheel torque in conjunction with an electric motor when in a hybrid configuration. Alternatively, the engine may generate wheel torque in conjunction with a hydraulic motor. Thus, there are many configurations whereby features of the present description may be used to advantage.

Figure 2A:
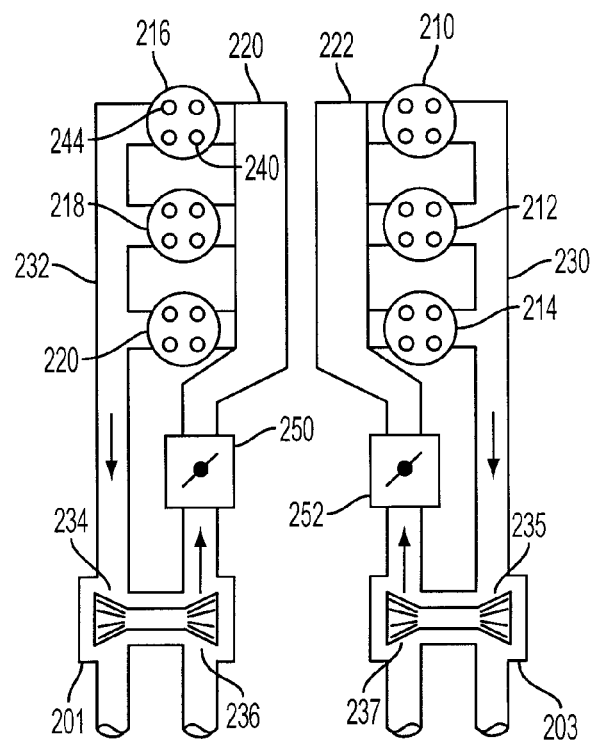
FIG. 2a is a schematic diagram of an example turbo charged engine configuration.

Referring now to FIG. 2a, a schematic of a turbo charged engine configuration is shown. The figure illustrates a six cylinder engine having two cylinder banks, typically referred to as a V6 engine. Cylinders 216, 218, and 220 comprise a first cylinder bank and cylinders 210, 212, and 214 comprise the second cylinder bank. The first cylinder bank is shown in communication with a first intake manifold 220. Intake manifold 220 is shown in communication with ambient air via throttle 250 and turbo charger 201. Throttle 250 may be electrically or mechanically actuated. Turbo charger 201 may be a variable geometry or waste gate type and compresses fresh air via compressor 236 which is driven by exhaust gases working on turbine 234. Alternatively, turbo charger 201 may be driven by an electric motor. Exhaust gases exit cylinder 216, 218, and 220 and are communicated to turbine 234 via exhaust manifold 232. Flow through cylinder 216 is controlled by variably actuated intake valve 240 and/or variable actuated exhaust valve 244. Alternatively, the engine may be configured with variably actuated intake valves and fixed timing exhaust valves. Variably actuated intake and/or exhaust valves may be actuated by electrical, hydraulic, pneumatic, or mechanical mechanisms. Intake valve 240 regulates flow from intake manifold 220 into cylinder 216. Exhaust valve 244 regulates flow from cylinder 216 to exhaust manifold 232. Cylinders 218, 220, 210, 212, and 214 are configured in the same manner as cylinder 216. In addition, the second cylinder bank comprised of cylinders 210, 212, and 214 is essentially a mirror image of the first cylinder bank. That is, intake manifold 222 is in communication with the second cylinder bank via intake valves and is also in communication with throttle 252 and with the compressor 237 of turbo charger 203. Exhaust manifold 230 is in communication with the second cylinder bank via exhaust valves and is also in communication with the turbine 235 of turbo charger 203. Note that the size and performance characteristics of the first cylinder bank components do not have to match the size and performance characteristics of the second cylinder bank. For example, turbo charger 201 may be capable of producing 20% more flow than that which may be produced by turbo charger 203, if desired. Also note that it is possible to extend this configuration to four, eight, ten, and twelve cylinder engines.

The turbo charger configuration shown in FIG. 2a allows separate control of throttles 250 and 252. It also allows separate control of intake valves, exhaust valves, spark ignition, fuel delivery, and turbo charges between the first and second cylinder banks since the air paths of the banks are independent of each other. Therefore, the cylinders of the first and second cylinder banks may operate with different cylinder air charge amounts. Further, since the valves may be variably actuated one of the cylinder banks may be deactivated (i.e., producing little or no positive torque) while the other cylinder bank continues to operate so that the engine efficiency may be increased.

Note that the manifold/throttle/valve configuration shown in FIG. 2A is not meant to limit or narrow the scope or breadth of this description. The cylinders of the respective banks form cylinder groups that are selected so that the engine will fire evenly (i.e., with substantially the same crankshaft angle distance between combustion event) while one of the cylinder groups is deactivated. Therefore, in other examples, the respective intake manifolds may be configured such that they span both cylinder banks. Furthermore, a cylinder group may be comprised of cylinders from one or more cylinder banks.

Figure 2B:
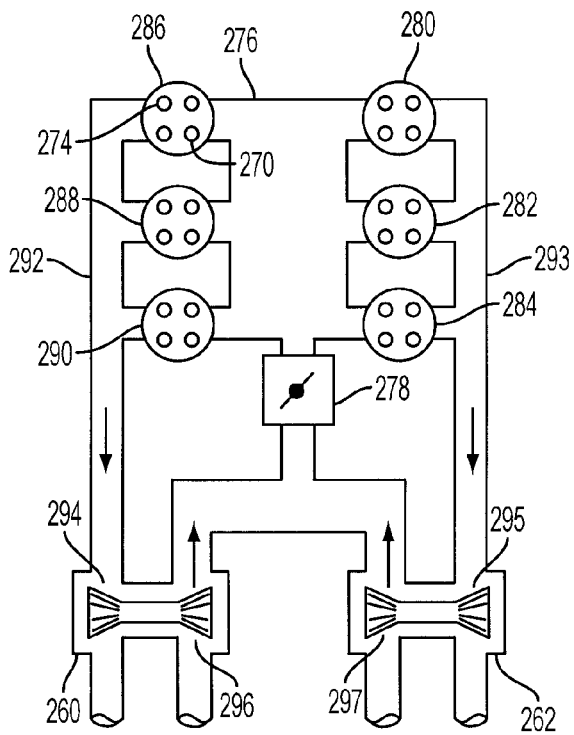
FIG. 2b is a schematic diagram of an alternate example turbo charged engine configuration.

Referring now to FIG. 2b, a schematic of an alternate turbo charge engine configuration is shown. The figure illustrates a six cylinder engine having two cylinder banks. Cylinders 286, 288, and 290 comprise a first cylinder bank and cylinders 280, 282, and 284 comprise the second cylinder bank. The first cylinder bank and the second cylinder banks are shown in communication with intake manifold 276. Intake manifold 276 is shown in communication with ambient air via throttle 278 and turbo chargers 260 and 262. Alternatively, a throttle may be provided to control air flow between each turbo charger and the intake manifold. Throttle 278 may be electrically or mechanically actuated. Turbo chargers 260 and 262 may be a variable geometry or waste gate type and compress fresh air via compressor 296 and 297 which are driven by exhaust gases working on turbines 294 and 295. Exhaust gases exit cylinder 286, 288, and 290 and are communicated to turbine 294 via exhaust manifold 292. Flow through cylinder 286 is controlled by variably actuated intake valve 270 and/or variable actuated exhaust valve 274. Variably actuated intake and/or exhaust valves may be actuated by electrical, hydraulic, or mechanical mechanisms. Intake valve 270 regulates flow from intake manifold 276 into cylinder 286. Exhaust valve 274 regulates flow from cylinder 286 to exhaust manifold 292. Cylinders 280, 282, 284, 288, and 290 are configured in the same manner as cylinder 286. Note that the size and performance characteristics of the first cylinder bank components do not have to match the size and performance characteristics of the second cylinder bank. For example, turbo charger 260 may be capable of producing 20% more flow than that which may be produced by turbo charger 262, if desired. Also note that it is possible to extend this configuration to four, eight, ten, and twelve cylinder engines.

The turbo charger configuration shown in FIG. 2b has a single throttle and the intake air path is shared between the two cylinder banks. The intake valves, exhaust valves, spark ignition, fuel delivery, and turbo charges may be separately controlled, but this configuration shares common intake manifold pressure between the cylinder banks. Since the valves may be variably actuated this configuration also allows one of the cylinder banks to be deactivated (i.e., producing little or no positive torque by mechanically or electrically closing intake and/or exhaust valves, for example) while the other cylinder bank continues to operate. However, changes in the valve timing of one cylinder bank may influence the torque produced in the other cylinder bank. Consequently, a more complex valve control algorithm may be used to control valve timing during cylinder deactivation when this configuration is used instead of the configuration shown in FIG. 2a. In addition, a valve or throttle may be necessary between the deactivated cylinder bank turbo charger and the intake system to prevent reverse flow through the deactivated turbo charger.

Figure 3:
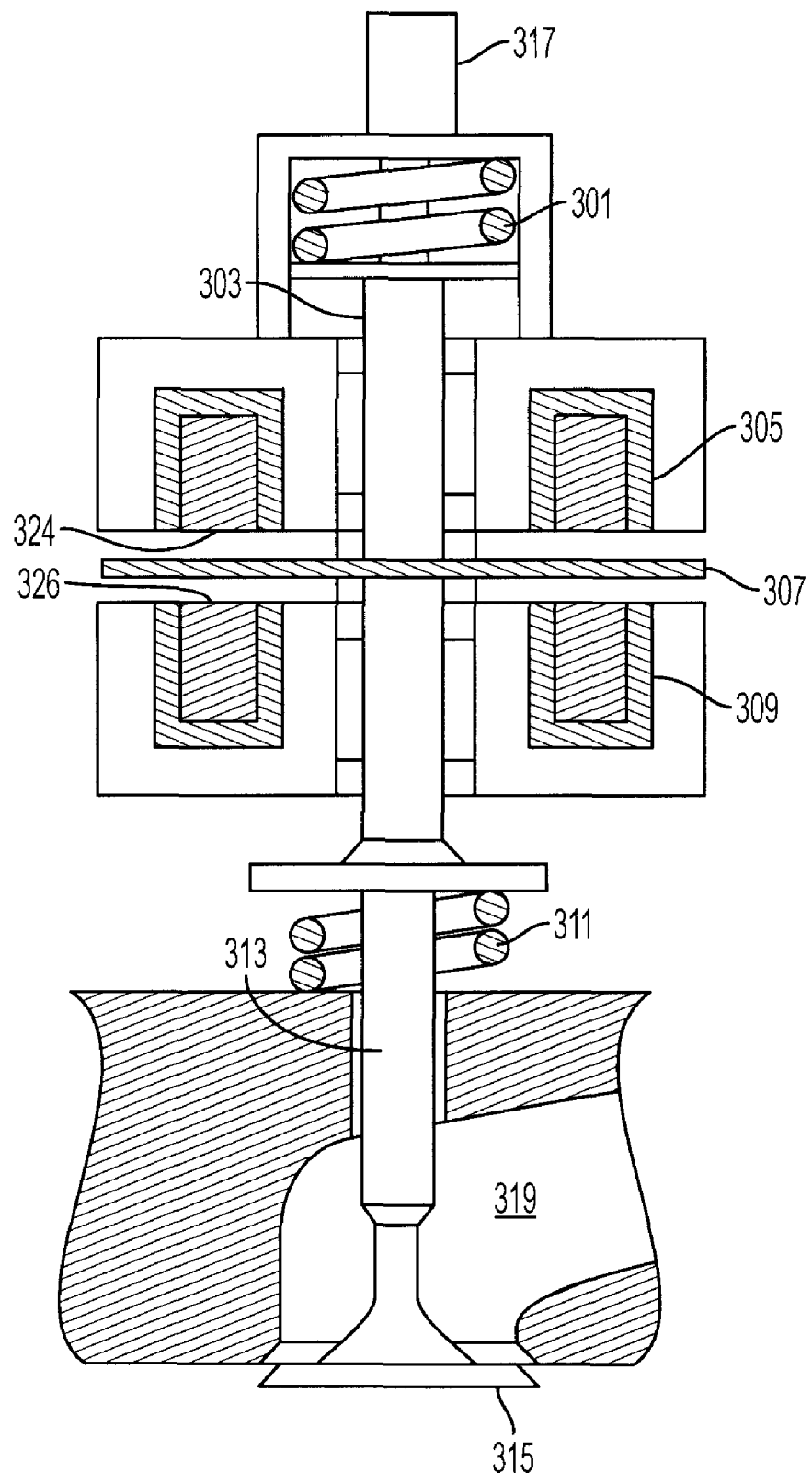
FIG. 3 is a schematic of an electrically actuated poppet valve.

Referring now to FIG. 3, a schematic of an example electrically actuated valve is shown. The valve actuator is shown in a de-energized state (i.e., no electrical current is being supplied to the valve actuator coils). The electromechanical valve apparatus is comprised of an armature assembly and a valve assembly. The armature assembly is comprised of an armature return spring 301, a valve closing coil 305, a valve opening coil 309, an armature plate 307, a valve displacement transducer 317, and an armature stem 303. When the valve coils are not energized the armature return spring 301 opposes the valve return spring 311, valve stem 313 and armature stem 303 are in contact with one another, and the armature plate 307 is essentially centered between opening coil 309 and closing coil 305. This allows the valve head 315 to assume a partially open state with respect to the port 319. When the armature is in the fully open position the armature plate 307 is in contact with the opening coil magnetic pole face 326. When the armature is in the fully closed position the armature plate 307 is in contact with the closing coil magnetic pole face 324.

In one embodiment, armature plate 307 includes permanent magnets. In another embodiment, armature plate 307 does not include permanent magnets. Permanent magnets may be used to reduce valve actuator current because the permanent magnet can hold the valve in a closed position in the absence of a holding current, at least during some conditions.

As one alternative, an electrical valve actuator may be constructed of a single coil combined with a two plate armature. In another alternative, the valve actuator may employ a lever mechanism between the actuator armature and the valve stem. This design may reduce power consumption in some circumstances since mechanical advantage of the lever may reduce the amount of current for valve opening and closing. The valve lift, duration, and timing methods described herein may also be extended to this and other actuator designs since actuator designs are not intended to limit the scope of this description.

Figure 4:
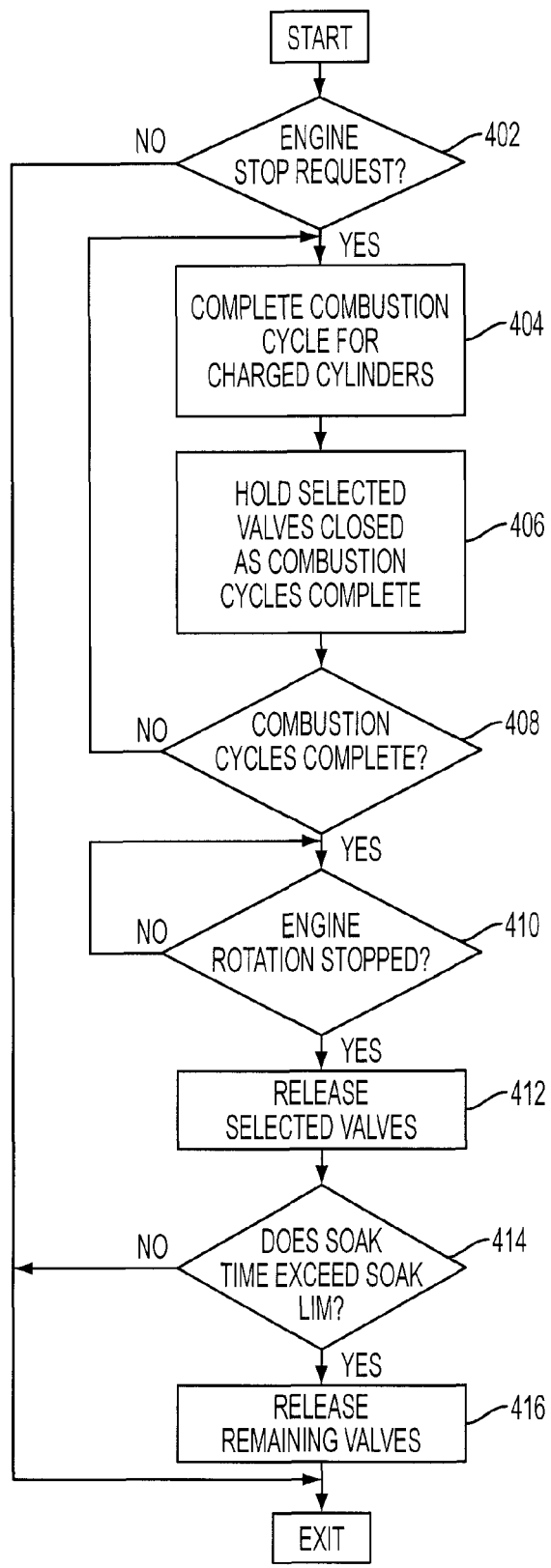
FIG. 4 is a flow chart of an example engine shutdown strategy.

Referring now to FIG. 4, a flow chart of an example engine shut-down strategy is shown. In step 402, the routine determines if there has been a request to stop the engine. The request to stop may come from an operator switch or from a system controller of a hybrid vehicle, for example. If there is a request to stop the engine the routine proceeds to step 404. If not, the routine proceeds to exit.

In step 404, the routine evaluates a series of status registers that contain an indication of the current stroke of each cylinder (e.g., power stroke, exhaust stroke, intake stroke, etc.) to determine the shutdown process for each cylinder, or alternatively for selected cylinders. Valves in cylinders that contain a non-combusted air-fuel mixture may be allowed to continue the current cylinder cycle so that the air-fuel mixture may be combusted before holding selected valves in the closed position. Valves in cylinders containing air without fuel may be deactivated (i.e., one or more selected valves are held in the closed position and combustion is inhibited) so that the shutdown time is shortened. Valves in cylinders containing exhaust gases may be controlled to trap or expel the residual exhaust gas mixture and then one or more valves may be held in a closed position after the exhaust is expelled or directly after the request for shutdown is received so that exhaust gases are trapped.

Alternative methods are also possible to shutdown one or more cylinders, for example, after a request to stop the engine, for one or more cylinders holding an uncombusted air-fuel mixture, combustion may be inhibited by deactivating the ignition and holding intake and exhaust valves closed so that the uncombusted air-fuel mixture remains in the cylinder which may enable the mixture to be used during a subsequent restart. Further, in another alternative, each cylinder or selected cylinders may add one or more additional combustion cycles to any of the above-mentioned cylinder deactivation sequences so that a fuel puddle reduction strategy may be executed. For example, for a cylinder in a power stroke during an engine stop request, the valves can be controlled such that the cylinder completes the current cycle and then the valve timing may be adjusted before an additional cylinder cycle is completed. One or more valves may be set to the closed position during the additional cylinder cycle so that flow through the cylinder is reduced.

Fuel flow to cylinders during a cylinder deactivation and/or engine stop request can also be controlled in a variety of ways. For port fuel injected engines fuel flow to a cylinder may be stopped immediately after a request to stop the engine or after a predetermined number of intake events of the respective cylinder, for example. If the fuel flow is stopped immediately then the valve timing may be adjusted so that the air and fuel match the desired cylinder air-fuel ratio. Alternatively, fuel flow and valve timing adjustments may be made over a predetermined number of cylinder induction events so that fuel puddles may be drawn into the cylinder before combustion is stopped. For fuel directly injected into cylinders, fuel flow may be stopped immediately after the request to stop, after a combustion event in the cylinder, or after a last induction event for the cylinder. Since the fuel flow is directly injected into the cylinder the valves may be closed partially through an induction event while the desired cylinder air-fuel ratio is maintained. Fuel may be injected by direct injection systems while the intake valve is open or after the intake valve has closed. The routine proceeds to step 406.

In step 406, selected valves may be held in a closed position as the engine decelerates and stops. Valves of a variable event valvetrain may be controlled in a flexible manner that goes beyond fixed four stroke valve timing. This allows the valves to be uniquely controlled so that engine performance and emissions may be improved. By closing selected valves during engine shutdown and/or during engine stop, gas flow through the engine and exhaust system may be reduced. Specifically, cylinder valves may be used to control oxygen flow into and exhaust gas flow out of the engine and exhaust system. Furthermore, holding one or more cylinder valves closed may reduce the flow of evaporative emissions (e.g., hydrocarbons) from the engine and exhaust system. In addition, holding one or more cylinder valves closed can provide a better seal to the engine and exhaust system than a closed throttle or throttle bypass valve since throttles generally do not assume a fully closed position during engine stop. For example, typically, a throttle has a minimum opening amount so that the engine can idle if throttle degradation occurs. In contrast, a cylinder valve may be set to a closed position so that nearly all flow through a cylinder is inhibited.

Continuing with step 406, selected valves operating in cylinders may be commanded to a closed position depending on the position of the engine and stroke of the cylinder. In one example, selected valves in cylinders that are between intake strokes during an engine stop request may be held in a closed position as the engine decelerates to a stop and while the engine is in the stopped position. For example, if a request to stop the engine occurs during the compression stroke of a certain cylinder then the intake valves of that cylinder may be held closed after the request to stop. The intake valves may be held closed as the engine decelerates and then for at least a portion of the engine stop period. During a subsequent engine restart the intake valves may be commanded to the open position and/or to open based on a four stroke cycle, for example. During an engine shutdown where intake valves are held closed, the exhaust valves may be commanded to retain a predetermined schedule (e.g., four, six, or two stroke) or they may be commanded to an open or closed position. In yet another alternative, during an engine shutdown, the intake valves are held closed and the cylinder exhaust valves may be held closed after the combusted air-fuel mixture is exhausted from the cylinder. In this way, the exhaust valves may be commanded closed, open, deactivated (e.g., the neutral position of an electrically actuated valve), or they may be operated based on engine position so that engine emissions and pumping work may be controlled in a desired manner. Furthermore, since the intake valves are held closed, operation of the exhaust valves has little effect on flow from the intake side of the cylinder to exhaust side of the cylinder.

The type of fuel delivery system can also influence the manner and sequence of intake valves during an engine shutdown/stop where it may be desirable to hold intake valves closed. For example, for a port fuel injected cylinder the intake valve may be held closed after the intake event is completed and retained in a closed position until the engine is restarted or until a specific time amount or condition has occurred. By completing the intake event it may be possible to better control the cylinder air-fuel ratio after the request to stop the engine and/or cylinder because it may be simpler to determine the amount of fuel that will enter the cylinder from the injector and/or from any fuel puddle that may have accumulated in the intake manifold.

On the other hand, if a request to stop the engine occurs during the intake stroke of a cylinder having fuel directly injected into the cylinder then the intake valve may be closed early. Since the engine is about to be stopped, fuel may be matched to the short duration induction event so that a stoichiometric air-fuel mixture is produced. Consequently, fuel can be conserved (by lowering the fuel amount to match the reduced air charge) while maintaining a stoichiometric air-fuel. This is possible since fuel delivery to a directly injected cylinder can be updated after the intake valve closes, at least under some conditions. Alternatively, during early intake valve closing, fuel flow to a directly injected cylinder may be inhibited so that the cylinder shutdown is earlier. That is, a partial air charge may be inducted followed by holding the intake valves closed and trapping the partial air charge, for example. Thus, a variable event valvetrain coupled with direct injection can provide additional benefits such as reduced fuel consumption and improved emissions during an engine shutdown. These benefits may be especially useful in applications where the engine is frequently stopped and restarted, sometimes referred to as stop-start applications.

As an alternative to holding intake valves closed after a request to stop an engine, exhaust valves may be held closed after the request to stop the engine. However, in some circumstances it may be desirable to exhaust any combusted gases remaining in the cylinder prior to commanding the exhaust valves to a closed position since evacuating exhaust gas from the cylinder may better prepare the cylinder for a subsequent restart. For example, if a request to stop the engine occurs during the compression stroke of a certain cylinder then the exhaust valves may be held closed after a last air-fuel mixture (i.e., an air-fuel mixture that is inducted prior to or during the engine stop request) has been combusted and exhausted from a cylinder. In this example the intake valves may be held closed after the last combustion event or they may be opened to periodically to regulate the amount of air in the cylinder. Alternatively, the intake valves may continue to operate in a predetermined manner (e.g., four, six, or two stroke basis) or they may be set to an open or neutral position. In this example, flow through the cylinder is limited since the exhaust valves of the cylinder are closed.

In some circumstance it may be beneficial to combust and exhaust a last air-fuel mixture and then trap a known volume of air in the cylinder. By trapping a known amount of air in the cylinder and injecting fuel into the cylinder for a subsequent restart of the engine starting time may be reduced, for example. On the other hand, in some circumstances it may be beneficial to create a vacuum in the cylinder so that fuel can be injected at the same time as the intake valve is opened during an engine restart so that fuel may vaporize better. Note that it is also possible to control selected valves to be held closed between the period between the request to stop and the actual engine stop or between the engine stop and engine start period. That is, valves do not have to be held closed during the entire period between the request to stop and a subsequent restart. The valves may be held closed during a fraction of the period from the shutdown request to restart depending on objectives.

Figure 6:
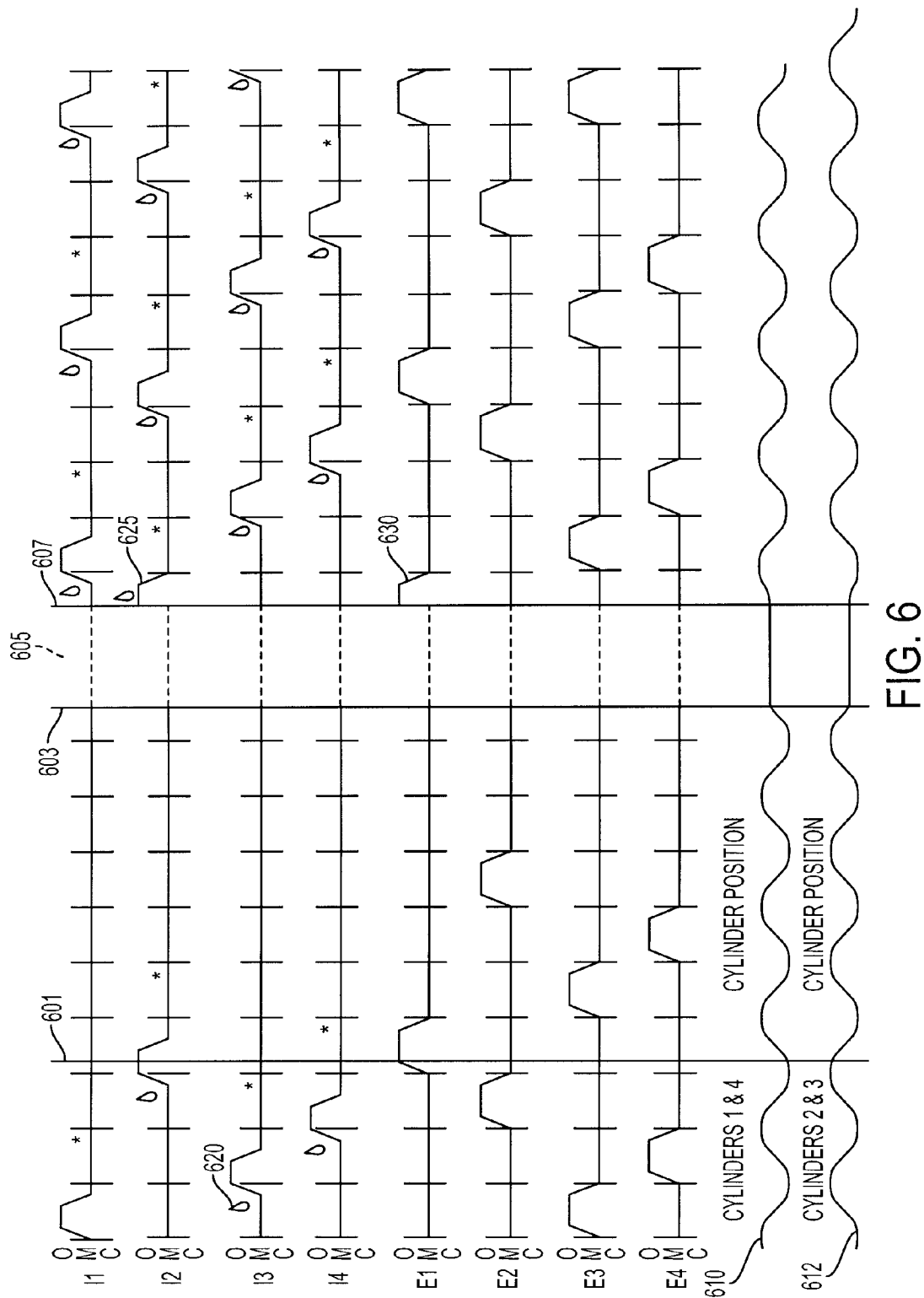
FIG. 6 is an example valve sequence during engine shutdown and start.
Figure 7:
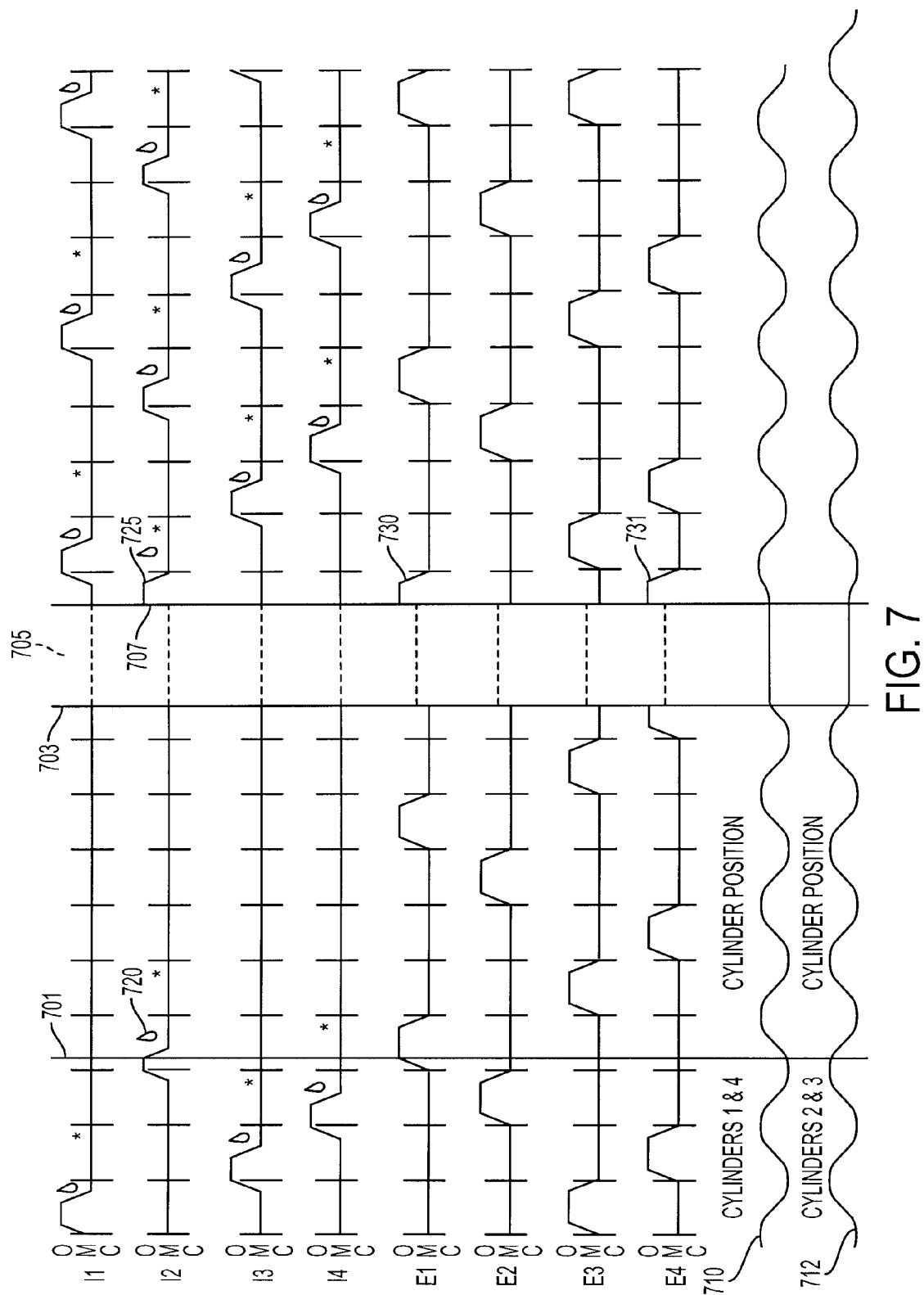
FIG. 7 is an alternate example valve sequence during engine shutdown and start.
Figure 8:
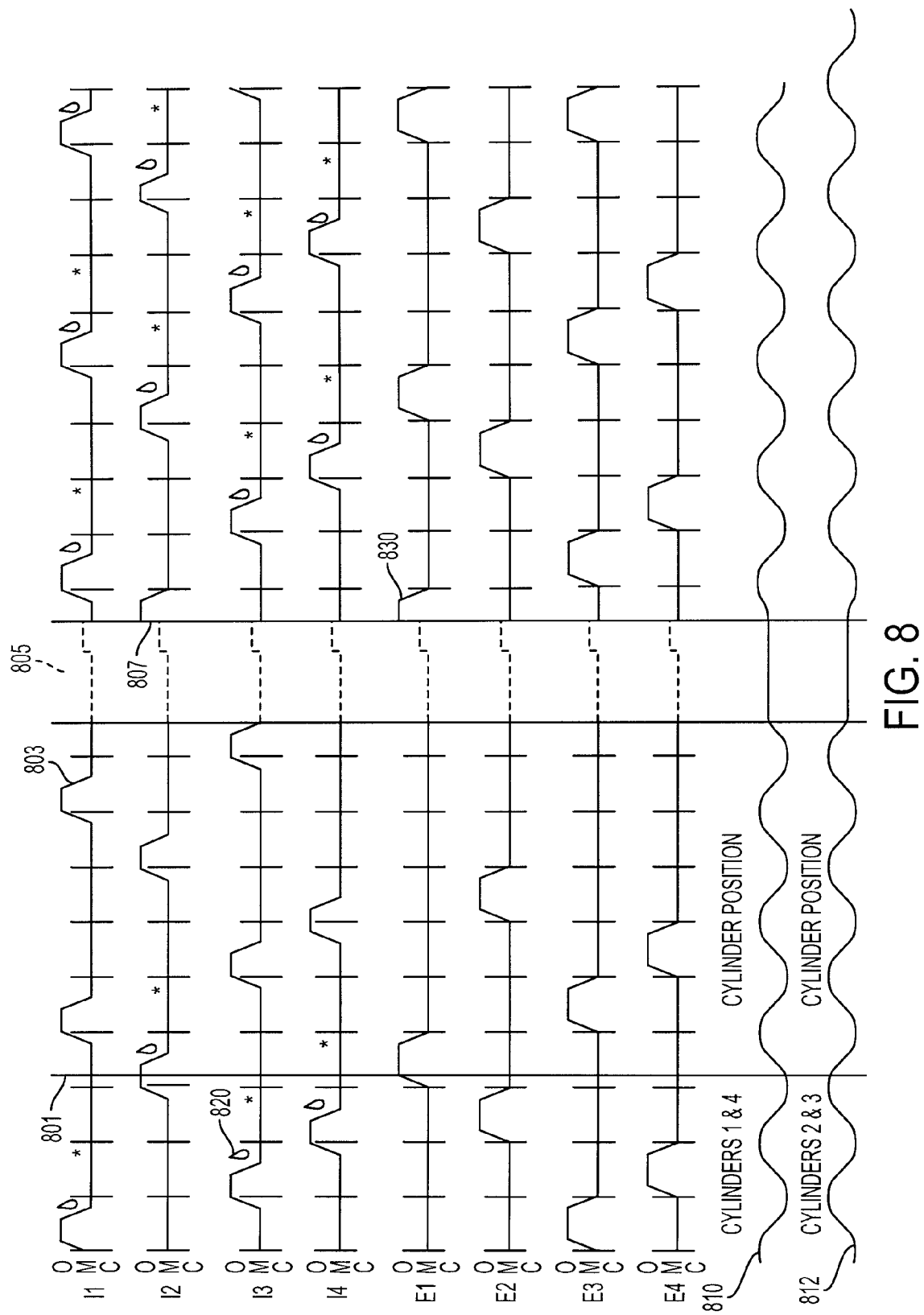
FIG. 8 is an alternate example valve sequence during engine shutdown and start.

By closing the intake and/or exhaust valves after a request to stop the engine, and by maintaining the intake valves in a closed position, flow into the exhaust and out of the engine may be reduced. This can be especially important when stopping engines that have electrically actuated intake valves that assume a neutral position while in a deactivated state (e.g., see FIG. 3) since valves in the deactivated state may allow flow through the engine and exhaust. In addition, as mentioned above, valves that are opposite the commanded closed valves (e.g., if intake valves are commanded closed the opposite valve is an exhaust valve or if an exhaust valve is commanded closed the opposite valve is an intake valve) may be commanded to an open or partially open position. This may reduce power consumption and/or engine pumping losses as the engine decelerates and when the engine is stopped. Also, a fraction of the engine cylinder valves may be controlled in this manner. That is, valves of three cylinders of a six cylinder engine may be controlled by one or more of the above mentioned methods. FIGS. 6-8 illustrate a few of the possible engine shutdown and starting sequences available and as such are not meant to limit the breadth or scope of the description. The routine proceeds to step 408.

In step 408, the routine assesses the state of one or more cylinders to determine if the last combustion cycle has been completed. If the last combustion cycle of the cylinders has not completed the routine returns to step 404. If the last combustion cycle of the cylinders has completed then the routine proceeds to step 410.

Note: the execution of step 406 may be replaced by step 408 and step 408 may be replaced by step 406 if it is desired to complete the last cylinder combustion event prior to holding selected valves closed.

In step 410, the routine determines if the engine rotation has stopped. If engine rotation has not stopped the routine closes appropriate valves to reduce flow through the engine and to reduce engine noise by one of the above-mention methods, for example, and waits until the engine stops. The routine proceeds to step 412.

In step 412, the engine controller may release selected valves. Some variable event valvetrains may employ valves that consume power in the open and/or closed position, the electrically actuated valves described by FIG. 3 for example. In these systems it may be beneficial to release one or more variable event valves so that electrical power consumption may be reduced during the engine stop. Intake and/or exhaust valves may be released if it is determined that flow through the engine cylinder will be small when the valve is released, if the battery state of charge is low, or if it is desirable to conserve electrical power, for example. The routine proceeds to step 414.

In step 414, the routine determines if the remaining closed valves should be released. The routine can make the determination by evaluating engine stop time (the amount of time that the engine has been stopped also known as the engine soak time), engine operating conditions (e.g., engine temperature, battery state of charge), operator inputs, inputs from ancillary systems (e.g., hybrid powertrain controllers) and/or from combinations or subcombinations of the previously mentioned conditions. If none of the previously mentioned inputs indicate that the valves should be held in a position then the routine proceeds to step 416. If conditions to release the valves are not met the routine proceeds to exit.

In step 416, the remaining valves that are held in a position are released. As mentioned previously, some variable event valvetrains may consume power when commanded to the closed state, for example. Therefore, it may be beneficial to reduce power consumption by releasing the valves and/or reducing or stopping power flowing to these valves. Some electrically actuated valves use permanent magnet armatures or poles that allow the valve to stay in a closed position if the pressure drop across the valve is below a certain amount. For these types of valve actuators it is possible to release the valve and inhibit flow through the cylinder by stopping power flowing to the valve since the permanent magnet provides the force to hold the valve in a closed position. After releasing the valves the routine proceeds to exit.

Figure 5:
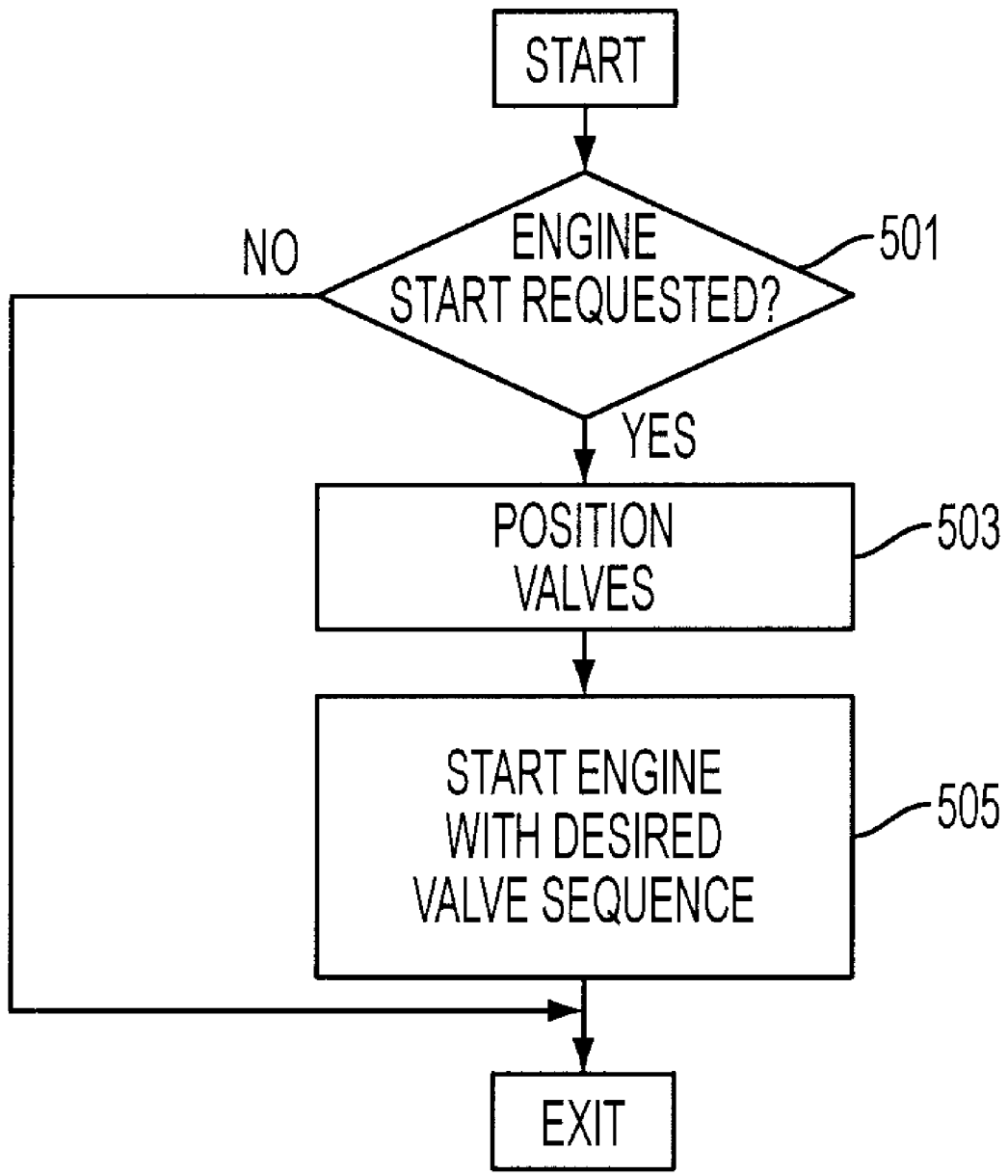
FIG. 5 is a flow chart of an example engine starting strategy.

Referring to FIG. 5, a flow chart of a method to start an engine with valves held in a closed position is shown. In step 501, the routine determines if there has been a request to start the engine. If so, the routine proceeds to step 503. If not, the routine proceeds to exit.

In step 503, valves are positioned based on the engine stopping position, cylinder firing order, and the engine starting requirements. Since valves may be held in a position during engine shutdown and stop the position of some valves relative to the desired stroke (e.g., intake, compression, exhaust, or power stroke) of a specific cylinder may be out of synchronization. For example, based on the position of pistons it may be desirable to set cylinder number one to an intake stroke. However, the intake valves of cylinder one may be held in the closed position if the engine is stopped using the method described in FIG. 4. Consequently, in step 503, the engine valves may be commanded to a desired position that is related to the engine position, desired firing order, and engine starting requirements. Therefore, in a condition where the intake valves are closed during an engine restart request and where an intake event is desired, the valve may be moved from a closed position to an open position, for example. One method for determining the desired stroke and valve sequence for a variable event valvetrain is described in U.S. patent application Ser. No. 10/805,645 filed Mar. 19, 2004 which is hereby fully and completely incorporated by reference. The method proceeds to step 505.

In step 505, the engine is started. After the valves are set to desired positions the engine may be started by assistance from a starter motor, directly started (started by combusting an air-fuel mixture in one or more cylinders), or started by a hybrid motor. As the engine rotates the valves are operated in a predetermined sequence (e.g. four-stroke or six-stroke) to operate the engine. After starting the routine proceeds to exit.

Note that the methods described by FIGS. 4 and 5 may be used to produce the engine valve sequences illustrated in FIGS. 6-8 and other sequences not presently illustrated. As such, FIGS. 6-8 are not meant to limit the scope or breadth of the description but merely as examples for illustration purposes.

Referring now to FIG. 6, an example valve timing sequence during an engine stop and subsequent start is shown. The illustrated sequence is a simulation that represents valve control for a four cylinder engine operating in a four-stroke cycle. Since it is possible to achieve the various illustrated valve trajectories present in the description using a variety of actuator types (e.g., electrically actuated, hydraulically actuated, and mechanically actuated), the type or design of the actuator employed is not meant to limit or reduce the scope of the description. In this example, the trajectories represent possible trajectories for electrically actuated valves.

The intake and exhaust valve position histories go from the left to the right hand side of the figure. The intake valve trajectories are labeled I1-I4 while exhaust valve trajectories are labeled E1-E4. At the beginning of each valve trajectory (i.e., the left hand side of the figure) is displayed the letters O, M, and C. These letters identify the valve open (O), mid (M), and closed (C) positions. The vertical markers along the valve trajectories identify the top-dead-center or bottom-dead-center positions for the respective cylinders. Vertical line 601 represents an example of an indication of where in time a request to stop the engine has occurred, vertical line 603 indicates the engine stopping position, and vertical line 607 indicates a request to start the engine. Engine fuel injection timing is indicated by fuel droplets (e.g., 620) and engine spark timing is indicated by an "*". Fuel injection timing for a port injected engine is shown. The valve timing and engine position markers can be related to the piston position of each cylinder of the engine (e.g., lines 610 and 612). Pistons 1 and 4 are in the same positions in their respective cylinders while cylinders 2 and 3 are 180° out of phase with cylinders 1 and 4.

After a request to stop 601, the intake valves remain closed until the engine start request. In this example, the stop request occurs during an intake event of cylinder 2 and the injection timing is performed when the intake valve of the respective cylinder is closed. The intake valve is shown finishing the induction event that is in progress. However, it is also possible to shut the intake valve earlier after a request to stop so that the cylinder charge is reduced. The last combustion event prior to engine stop occurs in cylinder 2 since the intake valves of the remaining cylinders are held closed after the stop request. The exhaust valves continue to operate until the contents of the respective cylinders are exhausted and then they are held in a closed position. Alternatively, the exhaust valves can be held closed after a request to stop until the engine stops without having exhausted the cylinder contents. That is, the exhaust valves can be held closed after a request to stop without exhausting the cylinder contents. Further, it is also possible to close all cylinder valves while inhibiting combustion (e.g., by inhibiting the ignition spark) after the request to stop so that an air-fuel mixture is trapped within the cylinder. By trapping an air-fuel mixture in the cylinder it may be possible to reduce starting time by combusting the mixture during a subsequent engine start request.

Region 605 is between engine stop and engine start. This region represents the engine off or engine soak period and it may vary in duration. As such, the soak time is meant for illustration purposes only and is not intended to define any specific duration. The engine may be restarted after this period by cranking the engine or by directly starting the engine by injecting fuel into cylinders holding trapped air, for example. The figure also shows that all engine valves are held closed during the soak period. By holding the valves closed engine evaporative emissions and disruption of the catalyst state may be reduced since air flow into the engine may be reduced while engine rotation has stopped. Alternatively, it is also possible to release one or more of the valves to the valve middle position so that one group of valves is held closed while a second group of valves is released to the middle position. Further, the valves may be released to the middle position in response to an amount of time since engine stop, an engine operating condition (e.g., engine temperature, catalyst temperature, condition of a hybrid powertrain, or battery state of charge), or until an external request such as a request by a hybrid powertrain controller, for example.

The engine is restarted by setting the timing of the valves. The valves may be set to the timing that they operated at prior to the engine stop request or they may be timed such that the engine initiates a first combustion event at a predetermined cylinder, for example. In the starting event illustrated in FIG. 6 fuel is injected during an open valve of cylinder 2 and is combusted thereafter. In this example, the starting request initiates the opening of cylinder 2 intake valve 625 and cylinder 1 exhaust valve 630. Operation of the other valves follow based on a four-stroke cycle that is relative to the position of the rotating engine.

Referring now to FIG. 7, an alternate example valve timing sequence during a stop and subsequent start of a four cylinder engine is shown. The illustrated sequence is similar to that shown in FIG. 6 and uses the same designations for valves, valve positions, spark, and fuel timing. However, in this sequence fuel directly injected into the cylinder is represented.

Vertical line 701 represents an example of an indication of where in time a request to stop the engine has occurred, vertical line 703 indicates the engine stopping position, and vertical line 707 indicates a request to start the engine. Engine fuel injection timing is indicated by fuel droplets (e.g., 720) and engine spark timing is indicated by an "*". The valve timing and engine position markers can be related to the piston position of each cylinder of the engine (e.g., lines 710 and 712). Pistons 1 and 4 are in the same positions in their respective cylinders while cylinders 2 and 3 are 180° out of phase with cylinders 1 and 4.

After a request to stop 701, the intake valves remain closed until the engine start request. In this example, the stop request occurs during an intake event of cylinder 2 and causes an early closure of cylinder 2 intake valve. Since fuel is directly injected into the cylinder the injection is may occur while the intake valve is open or while the intake valve is closed. The last combustion event prior to engine stop occurs in cylinder 2 since the intake valves of the remaining cylinders are held closed after the stop request. The exhaust valves continue to operate as if the respective cylinders were operating in a four-stroke valve timing mode. Alternatively, the exhaust valves can be held closed after a request to stop until the engine stops without having exhausted the cylinder contents or they may be held closed after the respective cylinder are exhausted. Further, it is also possible to close all cylinder valves while inhibiting combustion (e.g., by inhibiting the fuel and/or spark delivery) after the request to stop.

Region 705 is between engine stop and engine start. This region represents the engine off or engine soak period and it may vary in duration. As such, the soak time is meant for illustration purposes only and is not intended to define any specific duration. The engine may be restarted after this period by cranking the engine or by directly starting the engine by injecting fuel into cylinders holding trapped air, for example. The figure also shows that exhaust valves are released after the engine reaches a stop position. By releasing the exhaust valve it may be possible to reduce power consumption of electrically actuated valves while the engine is not operating. Further, since the intake valves remain closed, engine evaporative emissions and disruption of the catalyst state may be reduced since air flow into the engine may be reduced while engine rotation has stopped. As mentioned above, the valves may be released to the middle position in response to an amount of time since engine stop, an engine operating condition (e.g., engine temperature, barometric pressure, catalyst temperature, condition of a hybrid powertrain, or battery state of charge), or until an external request such as a request by a hybrid powertrain controller, for example. Further still, one group of valves may be held in the position the valve assumed at engine stop while others are positioned and/or released in response to operating conditions of the engine and/or vehicle.

After a start request, the engine is restarted by setting the timing of the valves. The valves may be set to the timing that they operated at prior to the engine stop request or they may be timed such that the engine initiates a first combustion event in a predetermined cylinder, for example. In the starting event illustrated in FIG. 7 fuel is injected after a cylinder 2 valve opening and is combusted thereafter. In this example, the starting request initiates the opening of cylinder 2 intake valve 725, cylinder 1 exhaust valve 730, and cylinder 4 exhaust valve 731. By opening cylinder 1 and 4 exhaust valves early it may be possible to improve the spin up of a turbo charger. Operation of the other valves follow based on a four-stroke cycle that is relative to the position of the rotating engine crankshaft.

Referring now to FIG. 8, an alternate example valve timing sequence during a stop and subsequent start of a four cylinder engine is shown. Again, the illustrated sequence is similar to that shown in FIG. 6 and uses the same designations for valves, valve positions, spark, and fuel timing. However, in this sequence fuel directly injected into the cylinder is represented.

Vertical line 801 represents an example of an indication of where in time a request to stop the engine has occurred, vertical line 803 indicates the engine stopping position, and vertical line 807 indicates a request to start the engine. Engine fuel injection timing is indicated by fuel droplets (e.g., 820) and engine spark timing is indicated by an "*". The valve timing and engine position markers can be related to the piston position of each cylinder of the engine (e.g., lines 810 and 812). Pistons 1 and 4 are in the same positions in their respective cylinders while cylinders 2 and 3 are 180° out of phase with cylinders 1 and 4.

After a request to stop 801, the intake valves remain closed until late in the soak period. In this example, the stop request occurs during an intake event of cylinder 2 but the intake valve timing is maintained. Since fuel is directly injected into the cylinder the injection can be made after the intake valve is closed. The last combustion event prior to engine stop occurs in cylinder 2 since the intake valves of the remaining cylinders are held closed after the stop request. The exhaust valves continue to operate until exhaust gases are expelled from the respective cylinders and then they are held closed until late in the soak period. Alternatively, the exhaust valves can be held closed after a request to stop until the engine stops and then released without having exhausted the cylinder contents during engine rotation or they may be held closed after the respective cylinder are exhausted during engine rotation.

Region 805 is between engine stop and engine start. This region represents the engine off or engine soak period and it may vary in duration. As such, the soak time is meant for illustration purposes only and is not intended to define any specific duration. The engine may be restarted after this period by cranking the engine or by directly starting the engine by injecting fuel into cylinders holding trapped air, for example. The figure also shows that intake and exhaust valves are released later in the soak period. By releasing the valves it may be possible to reduce power consumption while the engine is not operating. As mentioned above, the valves may be released and/or positioned to the middle position in response to an amount of time since engine stop, an engine operating condition (e.g., engine temperature, catalyst temperature, barometric pressure, or battery state of charge), or until an external request such as a request by a hybrid powertrain controller, for example. In other words, the valves may be deactivated and/or released after a predetermined period that may be influenced by one or more of the previously mentioned conditions or factors. Thus, the engine valves may be positioned and/or released to a desired position, in response to vehicle/engine operating conditions, after an engine stop and before a request to start the engine. Further, the valves may be split up into two or more groups that are positioned and/or released at different times during the engine stop. This allows different valve sequences between different starting and stopping conditions so that the desired control objectives may be achieved.

The engine can be restarted by setting the timing of the valves from the mid position and proceeding in a manner similar to that described in FIG. 7. Further, in an alternate embodiment of the starting sequences shown in FIGS. 6-8, the engine may be directly started (i.e., where fuel can be directly injected into a cylinder) so that intake and exhaust valves can be closed or held closed during an engine restart (i.e., the valves do not have to be commanded to the full open position). Further still, since it is possible to actuate variable event valvetrains independent of crankshaft position, it is possible to start pairs of cylinders that have pistons in the same cylinder position and then transition the cylinders to a different more conventional firing order. For example, a four cylinder engine may be started by initially firing cylinders 1 and 4 as a pair and cylinders 2 and 3 as a pair. The valve timing of each cylinder pair may be set so that the cylinders induct and exhaust at the same position relative to the crankshaft. In this starting scenario it may be beneficial to exhaust the cylinder contents of one or more cylinder pairs before combustion in the cylinder pair is initiated. By exhausting the cylinder pair simultaneously, the speed of a turbo charger turbine located downstream of the cylinders may be increased at a higher rate during cylinder reactivation or engine starting.

Also note that it is possible for some electrically actuated valves to remain in a closed position after the valve is electrically released. That is, power flow to the valve has been stopped. For example, permanent magnet valves can be electrically released (i.e., no longer supplied by current or supplied at a lower level of current, or hydraulic pressure) and maintain a closed position since the attractive force of the permanent magnet can hold the actuator armature in a closed position. Therefore, the valve releases illustrated in FIGS. 6, 7, and 8 may also be interpreted as electrically or hydraulically releasing the valve and are therefore not meant to limit the scope or breath of the description.

Combinations and sub-combinations of the features illustrated in FIGS. 6-8 may be made in an order that may not be illustrated here but is within the scope of the description and as such FIGS. 6-8 are not intended to limit the scope or breadth of the description.

Figure 9:
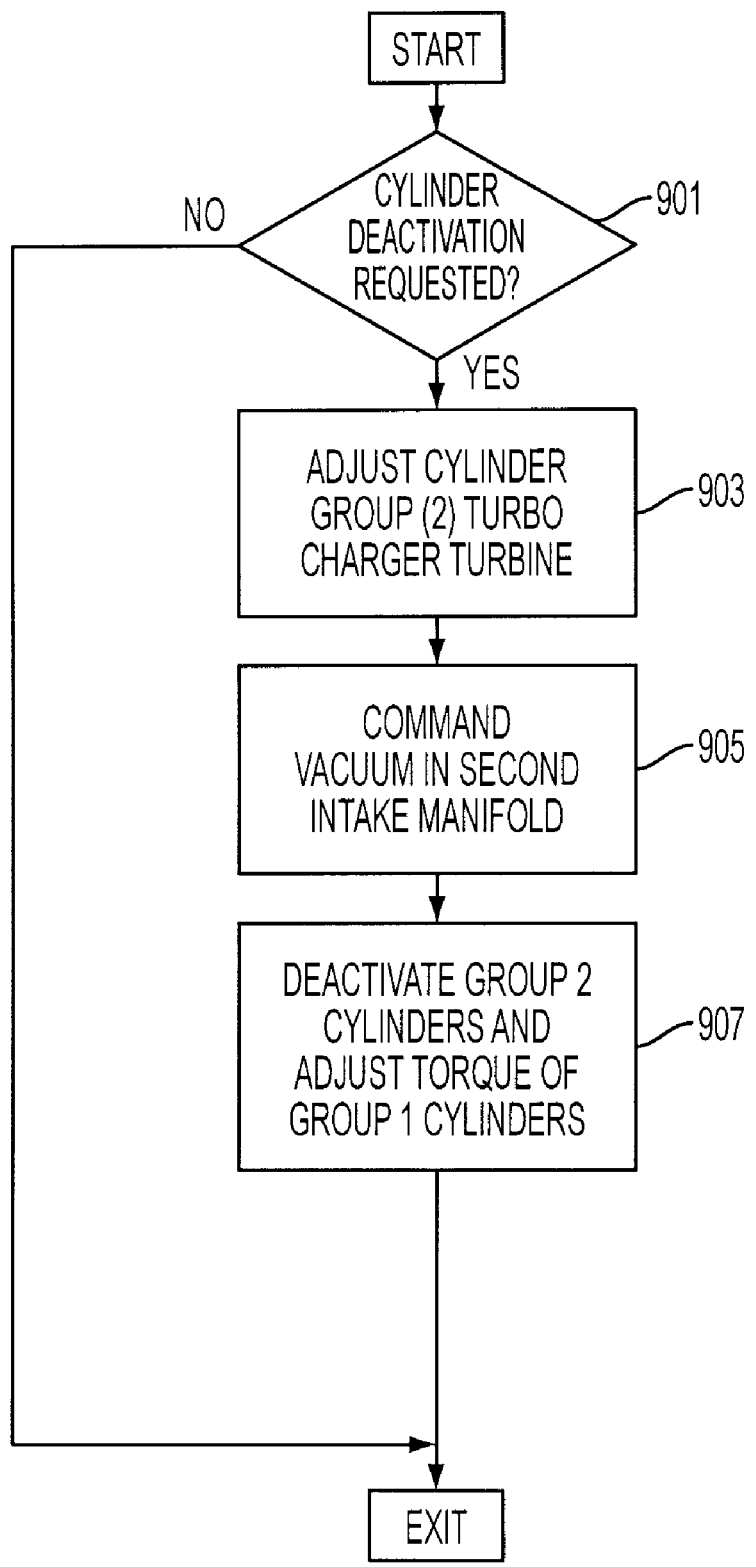
FIG. 9 is a flow chart of a cylinder deactivation strategy for an engine having two turbo chargers.

Referring now to FIG. 9, a flow chart of a routine to deactivate cylinders of an engine having variably actuated valves and two turbo chargers that are coupled to two cylinder banks through individual intake manifolds is shown. The description of FIG. 9 is made in reference to the configuration illustrated in FIG. 2a but may be applied to FIG. 2b as well, particularly if a second throttle or valve is used to isolate the turbo charger compressor outputs. In other words, in another embodiment of the system described in FIG. 2b is configured with a throttle or valve that can block the air flow from the active turbo charger to the deactivated turbo charger. The valve or throttle can prevent reversal rotation of the deactivated compressor when the engine goes into a cylinder deactivation mode, for example.

When a turbo charger compressor 237 rotates it draws air from the inlet side, compresses the air, and directs the air to the outlet side. Consequently, a negative pressure can develop at the turbo charger inlet and a positive pressure can develop at the turbo charger outlet. The turbo charger compressor can continue to rotate and compress air from the inlet side of the turbo charger as long as exhaust energy is supplied to the turbine side of the turbo charger. However, during lower engine loads it may be desirable to deactivate a group of cylinders (e.g., 210, 212, 214) by closing the intake and/or exhaust valves of the cylinders, for example. Closing the intake and exhaust valves during cylinder deactivation can trap air and/or exhaust gas in the cylinder so that cylinder pumping work and oil consumption are reduced. Further, deactivating the cylinder group may improve the operating efficiency of the active cylinder group since the remaining cylinders may operate in a region where thermal efficiency is increased and pumping losses are reduced.

When a cylinder group that supplies exhaust gases to a turbo charger is deactivated the energy input to the turbo charger is decreased and the turbo charger turbine speed will decrease. If the flow of exhaust energy is stopped long enough, compressor rotation may stop and/or reverse direction. This occurs because when exhaust flow to the turbine is stopped the pressure across the turbine can reach equilibrium so that there is little, if any, pressure drop across the turbine. If there is no pressure drop across the turbine then the turbine cannot generate torque to rotate the turbo charger compressor. On the other hand, deactivating the intake valves of a cylinder stops the flow of air through the respective cylinder and can cause the pressure at the outlet of the turbine to increase as the inertial energy of the compressor continues to cause the compressor to rotate. Further, the inlet side of the compressor can also be low due to the pumping operation of the compressor. Naturally, the higher pressure air on the outlet side of the compressor seeks a reduced energy state which can be achieved by reversing the rotation of the compressor and flowing air from the outlet side of the compressor to the inlet side of the compressor. Reverse rotation of the compressor is not prevented by the turbine because exhaust pressure equilibrates and reduces the pressure drop across the turbine.

It may be undesirable to reverse rotation of the compressor since it can increase the amount of time it takes the compressor to reach an efficient operating speed after the cylinder group is reactivated. Furthermore, reverse compressor rotation may make it more difficult to accurately determine air flow through the engine. The method described in FIG. 9 can reduce the possibility of compressor reverse rotation and can further provide a smoother cylinder deactivation transition.

In step 901, the routine determines if cylinder deactivation has been requested. If not, the routine exits. If so, the routine proceeds to step 903.

In step 903, operation of the turbo charger in communication with the group of cylinders to be deactivated is adjusted. The turbo charger efficiency and speed are lowered by adjusting the vane position or opening the waste gate of the turbo charger. This reduces the possibility of increasing pressure on the outlet side of the turbo charger compressor before the cylinder group is deactivated, thereby reducing the possibility of compressor reverse rotation.

In addition, the routine begins to adjust the torque generated by the active cylinder group to compensate for the torque loss associated with lowering the turbo charger efficiency of the cylinder group that will be deactivated. The active cylinder group torque can be increased by adjusting valve timing, moving the throttle position, increasing turbo charger boost, or by combinations of these devices, for example.

One method to control engine torque in a coordinated manner is to use multivariable feedback on cylinder flow, intake manifold pressure, and exhaust manifold pressure. Further, estimates of control actions that attempt to achieve the desired control can be included. The actuators can be coordinated via a minimization of an objective function of the form:

$$Q = \frac{1}{2}\gamma_1(W_{cyl} - W_{cyl,d})^2 + \frac{1}{2}\gamma_2(p_i - p_{i,d})^2 + \frac{1}{2}\gamma_3(p_e - p_{e,d})^2$$

where $(\ )_d$ denotes the desired set-points for cylinder flow, $W_{cyl}$, intake manifold pressure, $p_i$, and exhaust manifold pressure, $p_e$ respectively. The parameters $\gamma_1, \gamma_2, \gamma_3$ represent calibration variables which can be used to shape the transient performance. The function Q instantaneously depends only on the valve timing; hence the valve timing, IVC, can used to minimize this term. Setting valve timing to reduce Q results in the following equation:

$$Q = \overline{Q} =$$
$$\frac{1}{2}\gamma_1(\overline{W}_{cyl}(p_i, p_e, W_{cyl,d}) - W_{cyl,d})^2 + \frac{1}{2}\gamma_2(p_i - p_{i,d})^2 + \frac{1}{2}\gamma_3(p_e - p_{e,d})^2$$

where $\overline{W}_{cyl}(p_i, p_e, W_{cyl,d})$ denotes the closest achievable cylinder flow to the desired set-point. If the desired set-point is achievable then $\overline{W}_{cyl}(p_i, p_e, W_{cyl,d}) = W_{cyl,d}$. The desired set-point for the cylinder flow may not be achievable during some conditions because of lower or upper valve duration limits. Next, $\overline{Q}$ can be reduced using electronic throttle and turbine actuation. Since the instantaneous value of $\overline{Q}$ cannot be affected by the electronic throttle and/or turbine actuation the expansion $$\overline{Q}(t + \Delta t) = \overline{Q}(t) + \Delta t \cdot \frac{d\overline{Q}}{dt}$$

is considered and a controller is derived to reduce a weighted sum of $$\frac{d\overline{Q}}{dt},$$

control effort, and the increment of control effort involved. It follows then that the desired throttle flow has the form:

$$W_{th,c} = W_{th,d} + K_1 \frac{\partial \overline{Q}}{\partial p_i} + K_2 \int_0^\tau \frac{\partial \overline{Q}}{\partial p_i} dt$$

while the desired turbine flow has the form:

$$W_{tu,c} = W_{th,d} + K_3 \frac{\partial \overline{Q}}{\partial p_e} + K_4 \int_0^\tau \frac{\partial \overline{Q}}{\partial p_e} dt$$

The throttle position and turbine position can then be determined so that they produce the desired flow rates by inverting the respective throttle and turbine flow characteristics. The coordinated control of throttle, valves, and turbo charger described above may be used to control cylinder flow for dual or single intake manifolds similar to those described in FIGS. 2a and 2b. The routine proceeds to step 905.

In step 905, the routine commands a vacuum or negative pressure in the intake manifold 222. By creating a pressure depression in the intake manifold it is possible that any residual positive pressure between the turbo charger compressor and throttle causes flow toward the intake manifold and thus reduces the possibility of reversing the rotation of the compressor.

A vacuum is created in intake manifold 222 by closing throttle 252 and if desired the valve timing of cylinder intake valves. The desired intake manifold vacuum may be determined from engine and/or turbo charger operating conditions prior to the cylinder deactivation request. For example, if the engine were operating at a higher speed and with a higher flow rate through the compressor, then a lower intake manifold pressure would be commanded so that there is a better possibility of stopping compressor rotation reversal. If the engine were operating at a lower speed and lower air flow rate, idle for example, a higher manifold pressure could be commanded since there would be less air pressure to dissipate between the turbo charger compressor and the throttle body. The routine continues to step 907.

In step 907, a cylinder group is deactivated and torque is compensated in the active cylinder group. The cylinder group is deactivated in order of combustion (e.g., for an eight cylinder having a firing order of 1-5-4-2-6-3-7-8 cylinders could be deactivated in 5-2-3-8 order) so that cylinders can complete a combustion event before being deactivated. During the deactivation period the intake and exhaust valves are held in a closed position to prevent flow through the cylinder. The exhaust from combustion may be trapped in the cylinder or it may be exhausted to the exhaust manifold. For port injected engines, trapping exhaust in cylinder allows the cylinder to act as an air spring and reduces the possibility of drawing oil into the cylinder since a positive pressure can be maintained in the cylinder for a large portion of the cylinder cycle. However, for an engine having fuel directly injected into the cylinder, air could be trapped in the cylinder during cylinder deactivation so that cylinder could be reactivated quicker since exhaust would not have to be expelled in to the exhaust manifold before the cylinder is restarted.

In addition, the output torque of cylinders in the active cylinder group is increased to compensate for the torque lost by deactivating cylinders. As mentioned above, a cylinder torque increase may be achieved by adjusting valve timing, increasing boost, controlling the throttle, or by spark timing, for example. In one example, the respective valve timings can be determined by the method illustrated in U.S. patent application Ser. No. 10/805,642 filed Mar. 19, 2004 which is hereby fully incorporated by reference. The routine exits after deactivating the desired cylinder group and compensating for the related torque loss.

Figure 10:
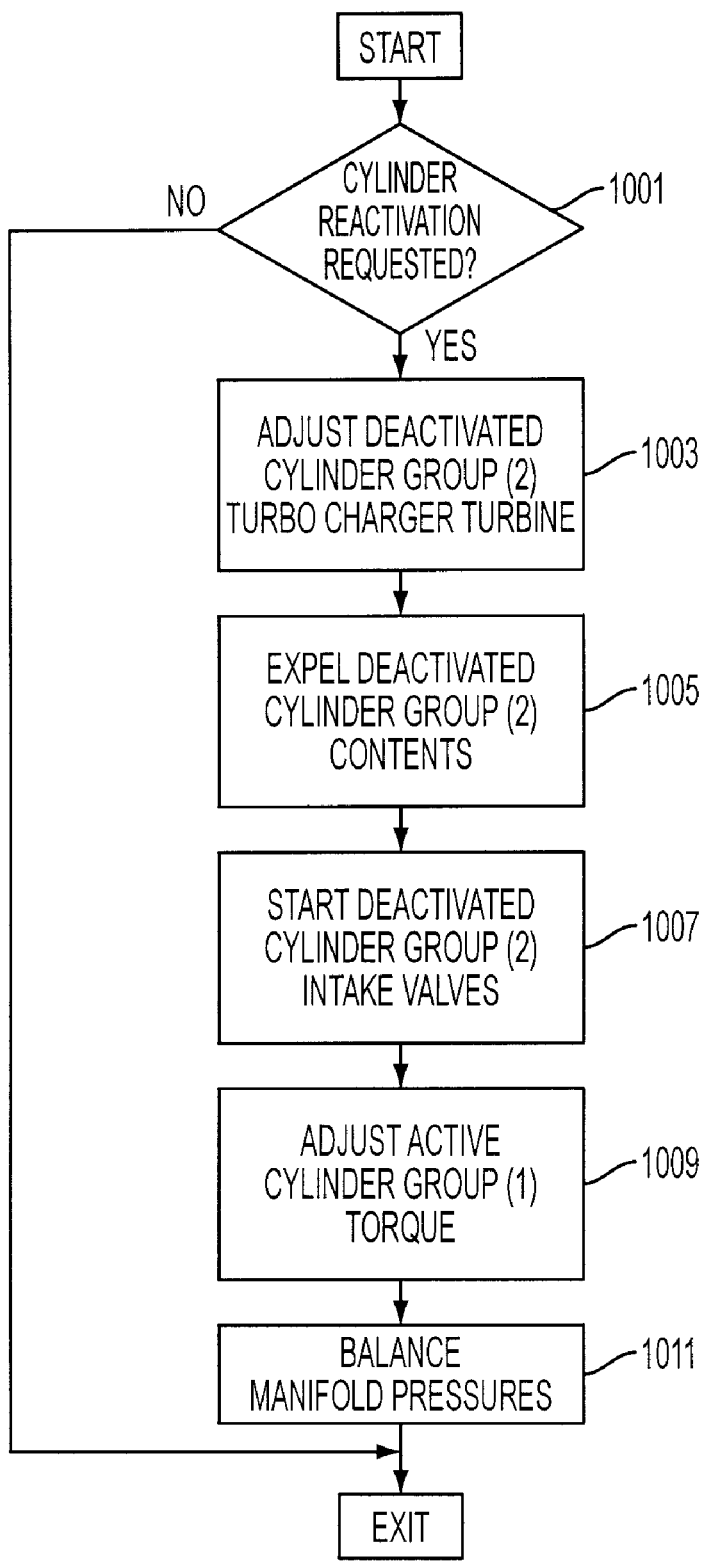
FIG. 10 is a flow chart of a cylinder reactivation strategy for an engine having two turbo chargers.

Referring now to FIG. 10, a flow chart for a cylinder reactivation method is shown. In step 1001, the routine determines if a request to reactivate cylinders has been made (i.e., to begin combustion in non-combusting cylinders). The request to reactivate cylinders can be based on one or more vehicle operating conditions. For example, the engine controller can request activation of cylinders based on operator torque demand, temperature of an exhaust gas after treatment device, cylinder reactivation after deceleration fuel shut off, engine coolant temperature, or various combinations of vehicle operating conditions. If there is a request to reactivate cylinders the routine proceeds to step 1003, if not, the routine proceeds to exit.

In step 1003, the turbo charger coupled to the deactivated cylinder group is adjusted. Before exhaust gases are introduced to the turbo charger the vanes of a variable geometry turbo charger or the waste gate of a turbo charger are adjusted so that they bypass little of the exhaust energy at the turbo charger. This can increase the speed and efficiency of the turbo charger. Alternatively, the turbo charger vanes or waste gate can be positioned for restarting the cylinder group any time between the time that the turbine speed is below a predetermined level and the time when cylinder reactivation is requested. By positioning the turbo charger vanes or waste gate to a closed position before exhaust gas is fed to the turbo charger allows more exhaust energy to be used to accelerate the turbo charger turbine as the cylinders are restarted. However, in some circumstance where the vanes of a turbo charge can be positioned quickly, the vanes can be set to an open position for a brief period of time or a predetermined number of cylinder combustion events and then closed. This can improve turbo charge spool-up (i.e., time to reach a desired turbo speed) because flow through the turbine is increased and by improving the volumetric efficiency of the engine. Later, when the vanes are closed, additional exhaust mass is used to increase the boost pressure. The routine then proceeds to step 1005.

In step 1005, cylinder contents of deactivated cylinders are exhausted. As mentioned above, for port fueled cylinders it may be beneficial to trap exhaust within a cylinder to reduce oil consumption and to reduce cylinder pumping losses. However, if the deactivated cylinders contain exhaust gas then the contents of each cylinder are exhausted in step 1005 by opening the exhaust valves during the exhaust stroke of the respective cylinder. This can reduce the possibility of misfire when fresh charge is inducted into the cylinder because the dilution of the charge may be limited. Furthermore, expelling exhaust from the cylinder can cause the turbo charger to begin to spin earlier so that turbo lag is reduced when the cylinders are restarted. Alternatively, for engines having fuel injected directly into the cylinder, air can be trapped in the cylinder during cylinder deactivation so that there is no need to exhaust the cylinder contents prior to initiating combustion in the cylinder. The routine proceeds to step 1007.

In step 1007, the valves of deactivated cylinders are restarted. Cylinders are restarted by opening intake valves of the first available cylinder to be capable of inducting an air charge and then starting the remainder of cylinders in order of combustion. During the transition from a deactivated cylinder to an active cylinder, a torque disturbance may be created by reactivating a cylinder or by an error between the desired engine torque and the torque generated during cylinder reactivation. The engine torque may be smoothed by initially starting the cylinders with a small charge and then migrating to a larger charge over a predetermined number of engine combustion events. For example, if a driver torque demand is to be shared equally between cylinders, and a cylinder is transitioning from inactive to active, the cylinder may be initially reactivated by inducting twenty five percent of the cylinder charge necessary to meet the desired cylinder torque. Then, over a number of cylinder events the cylinder charge can be increased so that the cylinder torque output matches the fraction of desired torque that the cylinder is scheduled to contribute. Alternatively, the cylinder may be reactivated by inducting a charge that matches the desired charge for the respective cylinder so that the cylinder reactivation occurs over a single cylinder cycle.

As mentioned above, cylinder reactivation can be initiated by driver demand or by other means. If the engine torque command is increasing at a sufficiently high rate it may be difficult for the engine torque to follow the desired torque because the turbo charger speed and efficiency may be low. Consequently, if the cylinder air flow rate is increased beyond an air flow rate that the turbo charger compressor can supply at the current operating conditions, then the cylinder torque may be temporarily reduced. This condition may be prevented by adjusting an actuator to vary the cylinder air charge as the air flow rate of the turbo charger varies. By limiting the valve timing, the cylinder air charge may be controlled such that the cylinder air charge increases monotonically as the desired torque moves from a lower value to a higher value. In one example, the intake valve closing position may be constrained by the following equation:

$$W_c \geq W_{cyl}(p, \text{IVC}, n, \text{bp})$$

Where $W_c$ is the turbo charger compressor mass flow, $W_{cyl}$ is the cylinder mass flow rate as a function of intake manifold pressure (p), intake valve closing location (IVC), engine speed (n), and barometric pressure (bp).

During some engine operating conditions (e.g., where there is degradation of a valve or valve controller) it may be beneficial to operate a variable event valvetrain at a fixed valve timing (i.e., operating at least a valve of a cylinder at a fixed open and closed duration relative to crankshaft position). The cylinder air amount may be adjusted by controlling the flow rate of a turbo charger and the position of a throttle where both devices are located upstream of the fixed timing valve. In addition, it is possible to have different valve timing modes (e.g., fixed and variable) that are selected in response to engine operating conditions (e.g., engine temperature, time since engine start, or degraded performance of a valve controller). Where valve timing is fixed, cylinder air charge can be adjusted, as mentioned above, by controlling the turbo charger compressor flow rate and by the throttle position. On the other hand, where valve timing is variable, cylinder air charge may be adjusted by adjusting the turbo charger compressor flow rate, valve timing, and the position of the throttle plate. The routine continues to step 1009.

In an alternative embodiment cylinder flow may be based on the expression:

$$\overline{W}\text{cyl,d}(k+1) = \overline{W}\text{cyl,d}(k)(1-\kappa(t)) + W_{cyl,d}(k)\kappa(t)$$

Where $0 < \kappa(t) < 1$ is maximized subject to the constrain that the estimated cylinder flow is monotonic.

In step 1009, the output torque of cylinders in the active cylinder group is adjusted based on the torque produced by the reactivated cylinders and by the desired engine torque.

Prior to cylinder reactivation, the charge amount (air and fuel) of the active cylinders is at a higher level than if all cylinders were active so that equivalent torque may be produced by fewer cylinders. This can increase the thermal efficiency and reduce the pumping losses of the cylinders because the pressure in the intake manifold is increased to meet the desired cylinder charge amount. During the cylinder reactivation transition, the charge in the active cylinders is reduced by adjusting valve timing of active cylinders so that the additional torque provided by cylinders that are being reactivated is compensated. In other words, the desired engine torque is produced by increasing the cylinder air charge of some cylinders and decreasing the cylinder air charge of other cylinders. This can be achieved by changing the valve opening duration, changing the valve closing position with respect to the crankshaft, or by changing the valve lift. Further, the engine torque may be reduced by retarding spark or by retarding spark and adjusting valve timing of the active cylinders. In this way, the engine torque output may be smoothed so that noticeable changes in engine operation are reduced. In addition, other torque disturbance rejection techniques may also be applied. For example, the clutches in a transmission coupled to the engine can be allowed to slip, or the torque converter clutch pressure can be reduced. The routine proceeds to step 1011.

In step 1011, manifold pressures are balanced between the two cylinder banks. The desired engine torque is produced by providing substantially equivalent torque (e.g., ±20 N–M) from both cylinder banks. This may be accomplished by controlling the intake manifolds to the same pressure and by operating the valve timings between the banks in a substantially similar manner (e.g., opening and closing times of the valves within ±15 Crankshaft angle degrees). Further, the throttles and turbo chargers can be operated in a substantially similar manner. However, if there is a noticeable difference between the cylinder group/bank air-fuel ratios or in the amount of fuel delivered to each cylinder group/bank to produce a desired air-fuel ratio, for example, then the throttles, valves, and turbo chargers can be adjusted by feedback control so that the cylinder bank outputs are more closely matched.

Controller 12 determines a desired pressure for the intake manifold 44. The desired pressure is based on canister vapor purge pressure, engine noise and vibration, and brake boost requirements. If the desired manifold pressure is below atmospheric pressure then the variable geometry turbo charger can be set to an open position and the throttle feedback controlled to set the desired manifold pressure. The valve timings are based on the desired manifold pressure and desired engine torque. On the other hand, if the desired manifold pressure is above atmospheric, then the throttle can be held open and then the cylinder air charge can be regulated by position of the VGT vanes and the valve timings. A similar strategy can be implemented by adjusting the waste gate position of a waste gate turbo charger as well.

Each of the intake manifolds are commanded to substantially equal pressures (e.g., ±0.07 bar) so that engine torque can be balanced between the cylinder groups. Furthermore, the cylinder groups can be operated at substantially similar valve timings. However, it is also possible to operate a first manifold that is in communication with a first cylinder group at a first manifold pressure while operating a second intake manifold at a second pressure so that one manifold may be used to supply vacuum to ancillary devices (e.g., brake boost and crankcase ventilation). Valve timing and/or lift may be adjusted between the cylinder groups so that each cylinder group provides substantially the same engine torque even though the manifold pressures may be different. For example, an engine with two intake manifolds can be operated so that pressure in one manifold is near atmospheric pressure (±0.07 bar) while the other manifold is operated 0.24 bar below atmospheric pressure. Coordination between valves, throttle, and turbo charger can be accomplished as described in FIG. 9, step 903.

Figure 11:
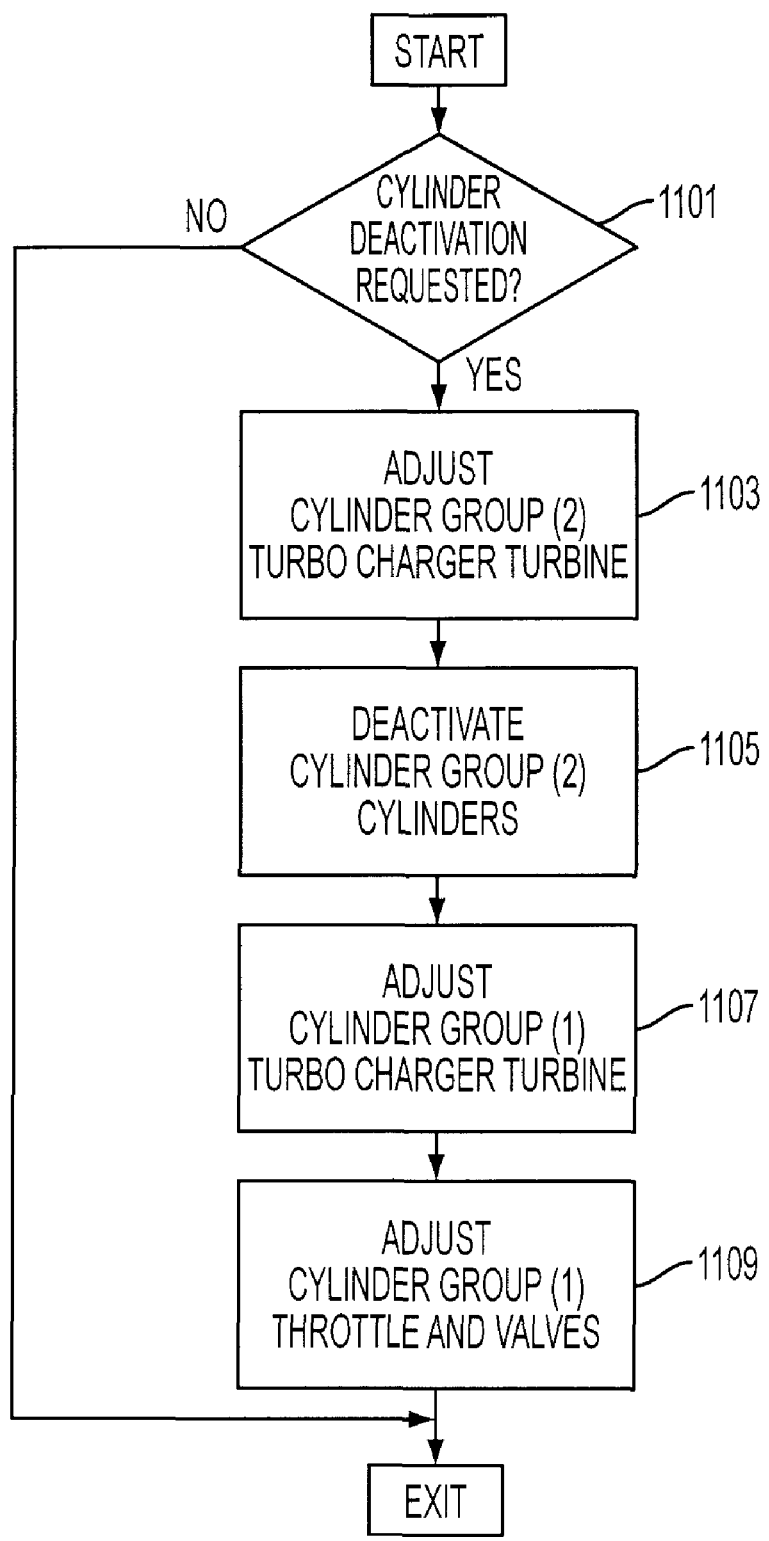
FIG. 11 is an alternative flow chart of a cylinder deactivation strategy for an engine having two turbo chargers.

Referring now to FIG. 11, a flow chart of a routine to deactivate cylinders of an engine with a common intake manifold is shown. In step 1101, the routine determines if there has been a request to deactivate cylinders. If so, the routine proceeds to step 1102, if not, the routine exits.

In step 1103, adjustments are made to the operation of the turbo charger that is in communication with the group of cylinders that are to be deactivated. Specifically, the waste gate or vanes are opened so that the turbo charger efficiency is reduced and so that the compressor speed is reduced.

In addition, the routine begins to adjust the torque generated by the active cylinder group to compensate for the torque loss associated with lowering the turbo charger efficiency of the cylinder group that will be deactivated. The active cylinder group torque can be increased by adjusting valve timing, moving the throttle position, increasing turbo charger boost, or by combinations of these devices, for example. Specifically, in one example, the valve opening duration of active cylinders can be increased so that cylinders of the active group produce additional torque and when matched with an adjusted fuel amount produce a stoichiometric mixture for combustion. In another example, the phase of the intake valve can be adjusted relative to a crankshaft position so that the intake valve closing occurs later in the intake stroke of the respective cylinder. The routine proceeds to step 1105.

In step 1105, cylinders of a selected cylinder group are deactivated. The cylinder group is deactivated in order of combustion (e.g., for an eight cylinder having a firing order of 1-5-4-2-6-3-7-8 cylinders could be deactivated in 5-2-3-8 order) so that cylinders can complete a combustion event before being deactivated. During the deactivation period the intake and exhaust valves can be held in a closed position to prevent flow through the cylinder. The exhaust from combustion may be trapped in the cylinder or it may be exhausted to the exhaust manifold. Port and directly fueled cylinders may be configured as mentioned above to trap or expel exhaust gases as desired. The routine proceeds to step 1107.

In step 1107, the efficiency of the turbo charger driven by the active cylinder group is adjusted. If the waste gate is partially open or if the vanes of a variable geometry turbo charger are at least partially open, then the waste gate or vane position may be reduced so that the turbo charge efficiency increases. As a consequence, the compressor can keep the intake manifold pressure substantially constant even though the output of the other compressor is reduced in step 1103. On the other hand, if there is little or no room for adjustment, the valve timing and throttle may be adjusted in step 1109 so that the engine torque may be substantially maintained through the cylinder deactivation sequence. The routine proceeds to step 1109.

In step 1109, the throttle and/or valves of the active cylinder group are adjusted. Engine torque may be maintained during the cylinder deactivation process by increasing the cylinder charge of the active cylinders. This can be accomplished by opening the throttle and/or by changing the valve timing, for example. By controlling the valve timing (e.g., lift, duration, and opening relative to the crank shaft position) charge entering the cylinder can be adjusted to compensate for torque loss of the deactivated cylinders. The respective valve timings, throttle position, and turbo charger vane position may be determined by the method mentioned above. The routine exits.

Figure 12:
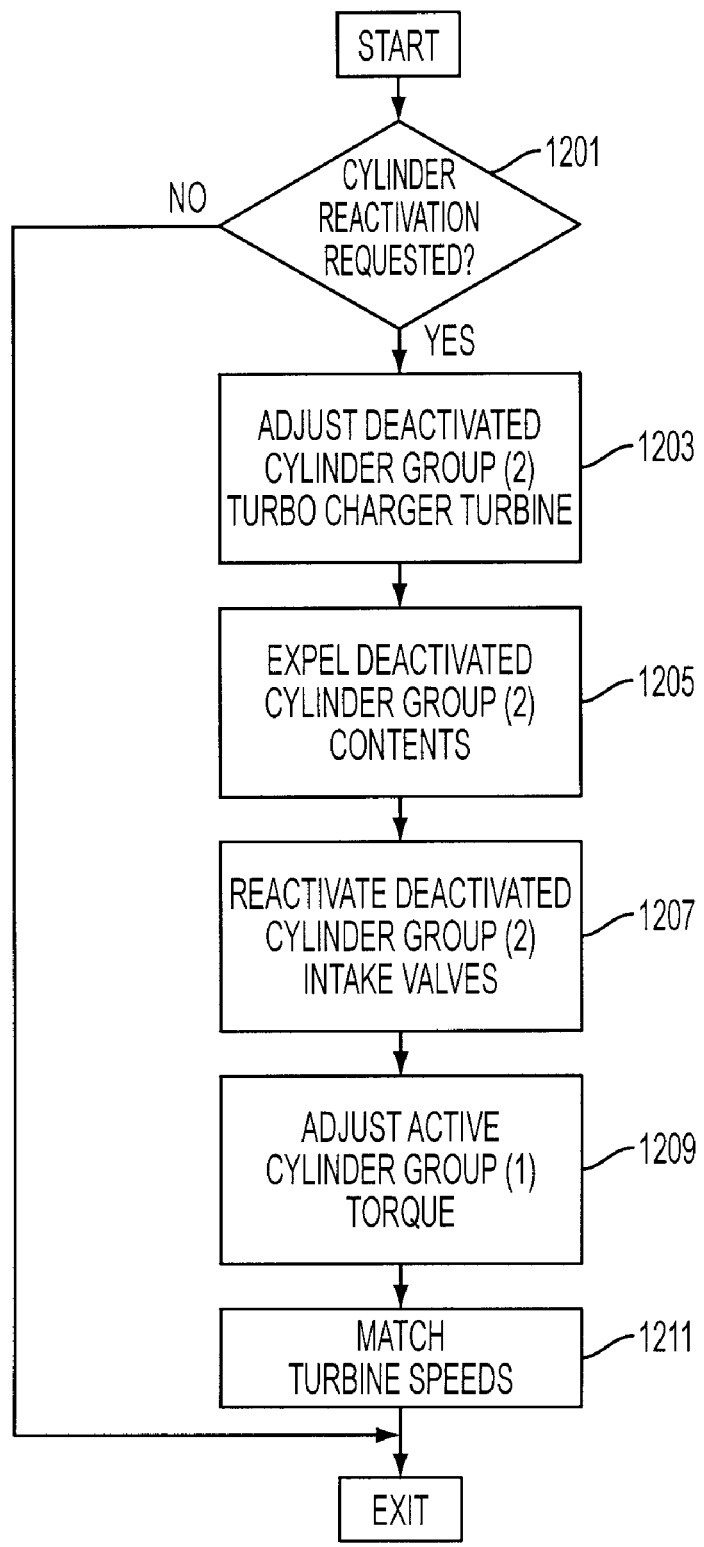
FIG. 12 is an alternative flow chart of a cylinder reactivation strategy for an engine having two turbo chargers.

Referring now to FIG. 12, a flow chart of a method to reactivate cylinders is shown. In step 1201, the routine determines if a request to reactivate cylinders has been made (i.e., to begin combustion in non-combusting cylinders). Similar to the method of FIG. 10, the request to reactivate cylinders can be based on one or more vehicle operating conditions. If there is a request to reactivate cylinders the routine proceeds to step 1203, if not, the routine proceeds to exit.

In step 1203, the turbo charger coupled to the deactivated cylinder group is adjusted. Specifically, the turbo charger may be adjusted as described in step 1003 of FIG. 10. The routine then proceeds to step 1205.

In step 1205, cylinder contents of deactivated cylinders are exhausted. This step uses the same procedure to expel exhaust gas from a cylinder as that described in step 1005 of FIG. 10. The routine proceeds to step 1207.

In step 1207, the valves of deactivated cylinders are restarted. Cylinders are restarted in order of combustion by opening intake valves and inducting fresh charge. Thereafter the cylinders follow a conventional four stroke cycle. The routine continues to step 1209.

In step 1209, the output torque of cylinders in the active cylinder group is adjusted based on the torque produced by the reactivated cylinders and by the desired engine torque.

During the cylinder reactivation transition, the charge in the active cylinders is reduced by adjusting valve timing of active cylinders so that the additional torque provided by cylinders that are being reactivated is compensated. In other words, the desired engine torque is produced by increasing the cylinder air charge of some cylinders and decreasing the cylinder air charge of other cylinders. Further, the engine torque may be reduced by retarding spark or by retarding spark and adjusting valve timing of the active cylinders. The routine proceeds to step 1211.

In step 1211, turbo charger turbine speeds are matched between the cylinder groups. Since the output of each turbo chargers is fed to a single common plenum the cylinders of the two or more cylinder groups will be exposed to the same inlet pressure plus or minus any difference caused by the intake manifold runners. Therefore, instead of balancing pressure between separate manifold as is described by step 1011 of FIG. 10, turbine speeds are matched between the cylinder groups. This can be accomplished by commanding the turbine waste gate or variable geometry turbo charger to the same position and then by adjusting the valve timing of one or both of the cylinder groups. The cylinder air flow of individual cylinders can be determined by detecting the oxygen concentration of the respective cylinder exhaust gas and the amount of fuel injected to the cylinder. If the exhaust gas is leaner than expected or if the amount of fuel delivered to one cylinder group/bank is greater than the amount delivered to the other cylinder bank then the valve duration of one cylinder group/bank may be reduced, for example. On the other hand, if the exhaust mixture is richer than expected or if the amount of fuel delivered to one cylinder group/bank is less than the amount delivered to the other cylinder bank then the valve duration may be increased. By adjusting the valve timing the flow of each cylinder can be controlled so that substantially the same amount of air flows through each cylinder. Since the flow of each cylinder is equalized the flow to the turbine is equalized and the turbines can converge to substantially the same speed.

Note that when a fuel control system is operating in a closed loop mode the actual cylinder air-fuel mixture will approach the desired air-fuel mixture. In this mode one or more fuel control correction parameters can be used to compensate the base fuel delivery calculations so that the desired air-fuel ratio is delivered to a cylinder. That is, the fuel control correction parameter can be multiplied by or added to the base fuel delivery command so that the desired cylinder air-fuel may be achieved. By monitoring the magnitude and sign of the fuel control correction parameter a judgment of the turbo charger output may be made. For example, if the backpressure of one turbo charged cylinder bank is higher than the backpressure of another cylinder bank, due to degradation of waste gate or vane control for example, then the exhaust of the cylinder bank having a higher backpressure will provide a richer mixture that is observable by an exhaust gas oxygen sensor. The closed-loop fuel controller in this example would sense that less fuel is required to produce a desired air-fuel mixture, thereby indicating a difference in the cylinder air charge of one of the cylinder banks/groups. On the other hand, where variations of part tolerances result in changes in cylinder air flow, it is possible that the cylinder with the higher average fuel flow would have a greater fuel flow and therefore a higher backpressure. In either example, the backpressure between the cylinder banks, and therefore the turbine speeds, may be balanced by adjusting valve timing and/or waste gate/vane position so that turbo charger operation and the flow through the cylinders may be substantially equalized (e.g., ±10%), at least under some conditions.

Variation of waste gate or vane geometry of each turbo charger can be compensated by fixing the command of the first turbo charger, fixing the valve timing, and fixing the throttle position, and then varying the command to the second turbo charger. This will allow the second turbo charger efficiency to be raised or lowered so that the manifold pressure will be changed. Then, the second turbo charger command can be fixed at a command as the command to the first turbo charger is varied. In this way, the influence of each turbo charger command can be related to the change in intake manifold pressure and/or cylinder air-fuel ratio so that the output of each turbo charger can be trimmed to a desired level based on the respective change in manifold pressure and/or cylinder air-fuel ratio. Further, the turbo charger adjustment and the resulting air flow change can be used to adapt turbo charger control parameters or to provide on-line way of determining turbo charger degradation. This procedure is not limited to cylinder reactivation, but may be applied whenever balancing the turbo charger flow between cylinders is desired.

Figure 13:
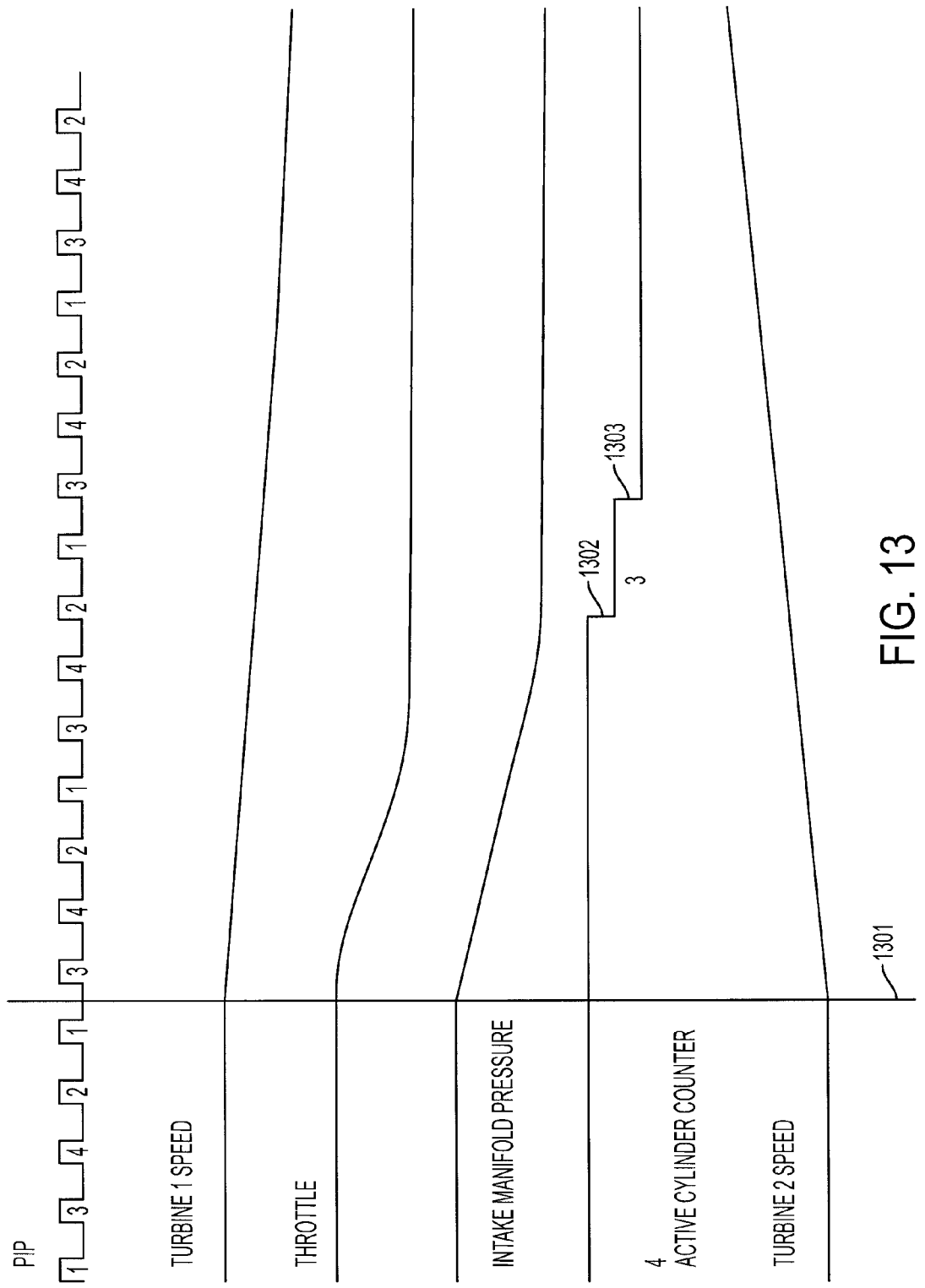
FIG. 13 is an example plot of signals of interest during a simulated cylinder deactivation sequence.
Figure 14:
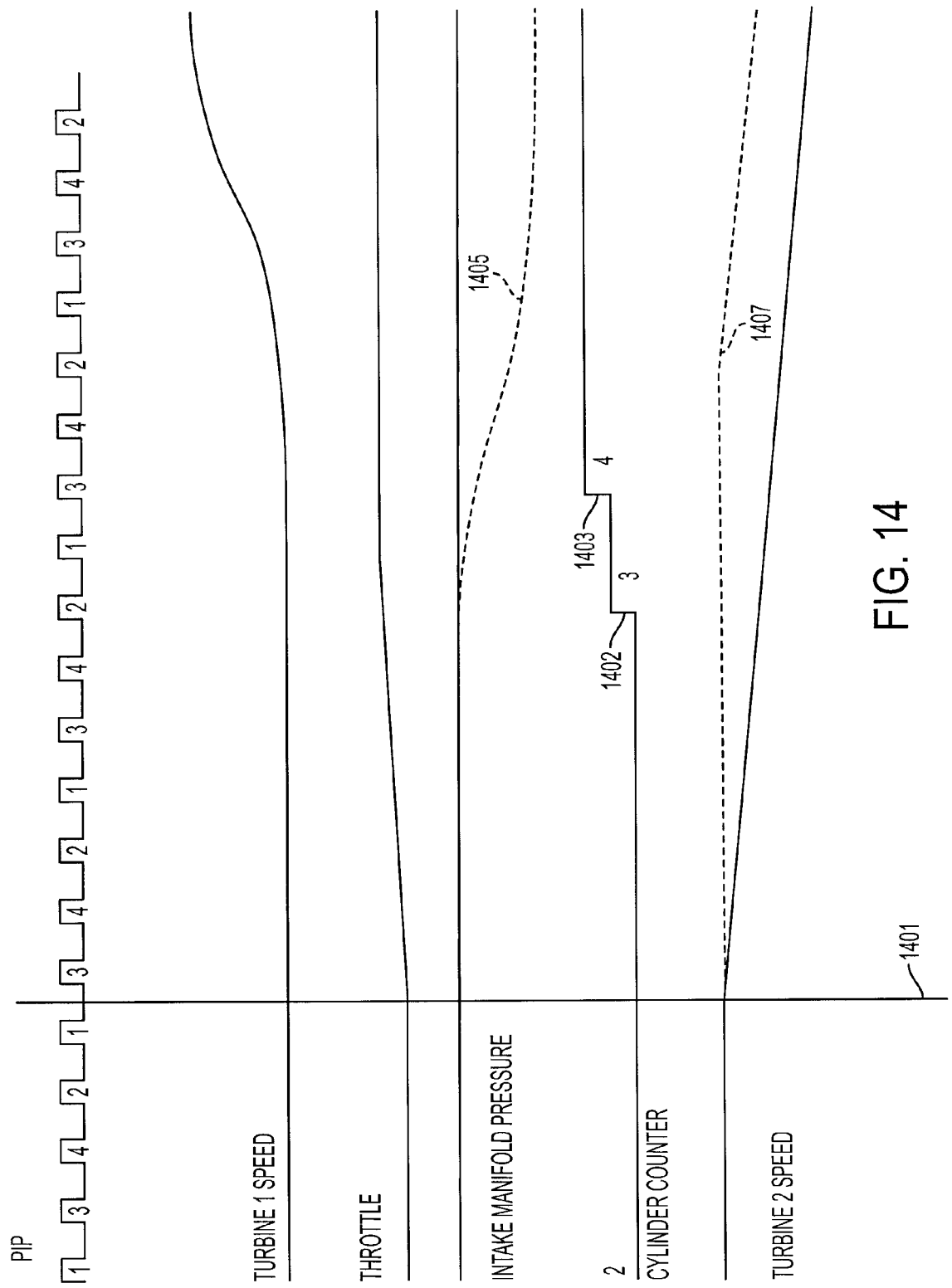
FIG. 14 is an example plot of signals of interest during a simulated cylinder reactivation sequence.

Also note that the methods described by FIGS. 9-11 can be used to control an engine as illustrated by FIGS. 13 and 14. Of course, variation of the signals illustrated in FIGS. 13 and 14 is possible without departing from the scope or breadth of the present description. Further, the methods described above may be used on single turbo charger configurations. For single turbo charger configurations the controls operating on the second turbo charger are eliminated, however, the active turbo charger flow and active group of valves are controlled in coordination with the deactivating group of cylinders.

Referring now to FIG. 13, a plot of selected example signals of interest for a simulated cylinder deactivation sequence is shown. Vertical line 1301 represents a request to deactivate cylinders. The cylinder deactivation request may be based on driver demand or it may be based on a request from an ancillary control module, a hybrid valve control module for example.

The sequence labeled "PIP" shows engine position of a four cylinder engine and the top-dead-center location of each cylinder is represented by the rising edge located to the left of the respective cylinder number. The turbine speed of the cylinder group to be deactivated, Turbine 1 Speed, begins to be reduced to the left of line 1301. The speed reduction is the result of opening the turbine vanes or a waste gate. The electrically controlled throttle 125 also begins to close to the left of line 1301 so that vacuum is reduced in the intake manifold. This tends to keep the compressor spinning in a forward flowing direction so that air flows toward the cylinders even after the intake valves are deactivated. On the other hand, if the intake valves were held closed while the compressor continued to spin and while the intake manifold pressure were above atmospheric pressure, it is possible that the manifold pressure would cause the compressor direction to reverse since energy flow from the deactivated cylinders would be reduced.

The active cylinder counter, labeled "Cylinder Counter", shows the location where the cylinders are deactivated (1302, 1303). Two of the cylinders, cylinders 2 and 3 for example, are deactivated after the intake manifold pressure reaches a predetermined level. This level may vary with engine operating conditions and barometric pressure, for example. The cylinders can be deactivated by stopping fuel flow to the cylinder group and/or by holding one or more of the cylinder valves in a closed position. The cylinders are deactivated in order of combustion. For example, for a four cylinder engine with a firing order of 1-3-4-2 cylinders 2 and 3 can be deactivated by deactivating cylinder 3, then cylinder 2, or by deactivating cylinder 2, then cylinder 3, depending on when the deactivation request occurs. In one embodiment, the intake valves and exhaust valves are held closed after the deactivation request such that an air-fuel mixture is combusted and trapped in the cylinder until the cylinder is reactivated. In another embodiment, at least one of the intake valves are held closed after the cylinder deactivation request and at least one of the exhaust valves are allowed to continue to operate. This allows a combusted air-fuel mixture to be exhausted while reducing or stopping flow through the cylinder.

The speed of the turbine, labeled "Turbine 2 Speed", driving the compressor that is in communication with the active cylinders, Turbine 2 Speed, is increased after the request to deactivate cylinders. This allows the active cylinders can generate power at or near a stoichiometric air-fuel ratio to compensate for the deactivated cylinders. Furthermore, the valve timings, valve lift, and valve phase relative to the crankshaft of the active cylinder group may be adjusted to compensate for the deactivated cylinders as well. In this way, cylinders of a twin turbo charged engine can be deactivated so that torque disturbances are mitigated.

Referring now to FIG. 14, a plot of example signals of interest for a simulated cylinder reactivation sequence is shown. Similar to FIG. 13, the sequence labeled "PIP" shows engine position of a four cylinder engine.

The turbine speed of the turbo charger in communication with the deactivated cylinder group, Turbine 1 Speed, is at a low speed until the cylinder reactivation process starts. Then, as the deactivated cylinders begin to combust the speed of the turbine increases until a desired speed is reached. The desired speed may be inferred by determining the pressure drop across the exhaust turbine or by flow into the intake manifold, for example. The turbine vanes are closed prior to cylinder reactivation so that a greater percentage of the exhaust energy is used to accelerate the turbine. Alternatively, the turbo charger vanes may be open initially and then closed after a predetermined number of cylinder combustion events occur so that the speed of the turbine increases at a higher rate.

The throttle position, labeled "Throttle", is also increased after a request to reactivate cylinders so that engine pumping losses will be low when the cylinder reactivation occurs. Alternatively, the throttle plate may be set to a desired position during or after the deactivation process so that throttle pre-positioning during cylinder reactivation may not be necessary. Torque control of the reactivated cylinders may be accomplished by adjusting valve timing, lift, and/or valve opening phasing with respect to the crankshaft. The valve timing adjustments can be made on an individual cylinder basis so that the air charge of reactivated cylinders is varied between cylinders and/or between events of an individual cylinder. Thus, the respective cylinder air charges can be regulated by adjusting throttle position and valve timing. Alternatively, the throttle may be moved before or after the deactivated cylinders are reactivated so that cylinder air charge is affected mostly by valve timing during the reactivation process.

The intake manifold pressure can remain near atmospheric pressure or may be depressed as illustrated by line 1405. Setting the intake manifold pressure near atmospheric pressure can reduce engine pumping work, but closing the throttle and lowering the intake manifold pressure can provide vacuum for brakes, for example, and/or reduce the amount of induction noise emanating from the engine system. If the throttle is set partially open and the valve timing is sufficiently long then reactivating the cylinder can reduce the intake manifold pressure and the valve timing may have to be adjusted as the manifold pressure varies to mitigate an engine torque disturbance.

The cylinder counter trace, labeled "Cylinder Counter", shows the number of active cylinders and where deactivated cylinders are reactivated. In this example, cylinders 2 and 3 are reactivated as the throttle is moving and as the active cylinder group turbine speed is being reduced. However, it is also possible to hold the turbine speed of the turbo charger that is in communication with the active cylinder group at a substantially constant speed until the cylinders are reactivated. In this example, the engine torque in activated cylinders can be adjusted by changing the valve timing, lift, and/or phase relative to the crankshaft position so that cylinder reactivation torque disturbances may be mitigated.

The turbine speed of the active cylinder group is shown being reduced so that the engine torque of the active cylinders may be reduced in accordance with the torque being added to the engine by reactivated cylinders. The turbine speed can be reduced by changing the vane position or by opening the waste gate so that the efficiency of the turbine decreases. By lowering the turbine speed of the turbo charger that is in communication with active cylinders the torque of active cylinders may be reduced with less adjustment to the valve actuators. Alternatively, as mentioned above, the turbine speed can be held substantially constant during cylinder reactivation and then it may be reduced thereafter, see line 1407 for example. This may make it easier to control engine torque during cylinder reactivation, at least during some conditions.

Figure 15:
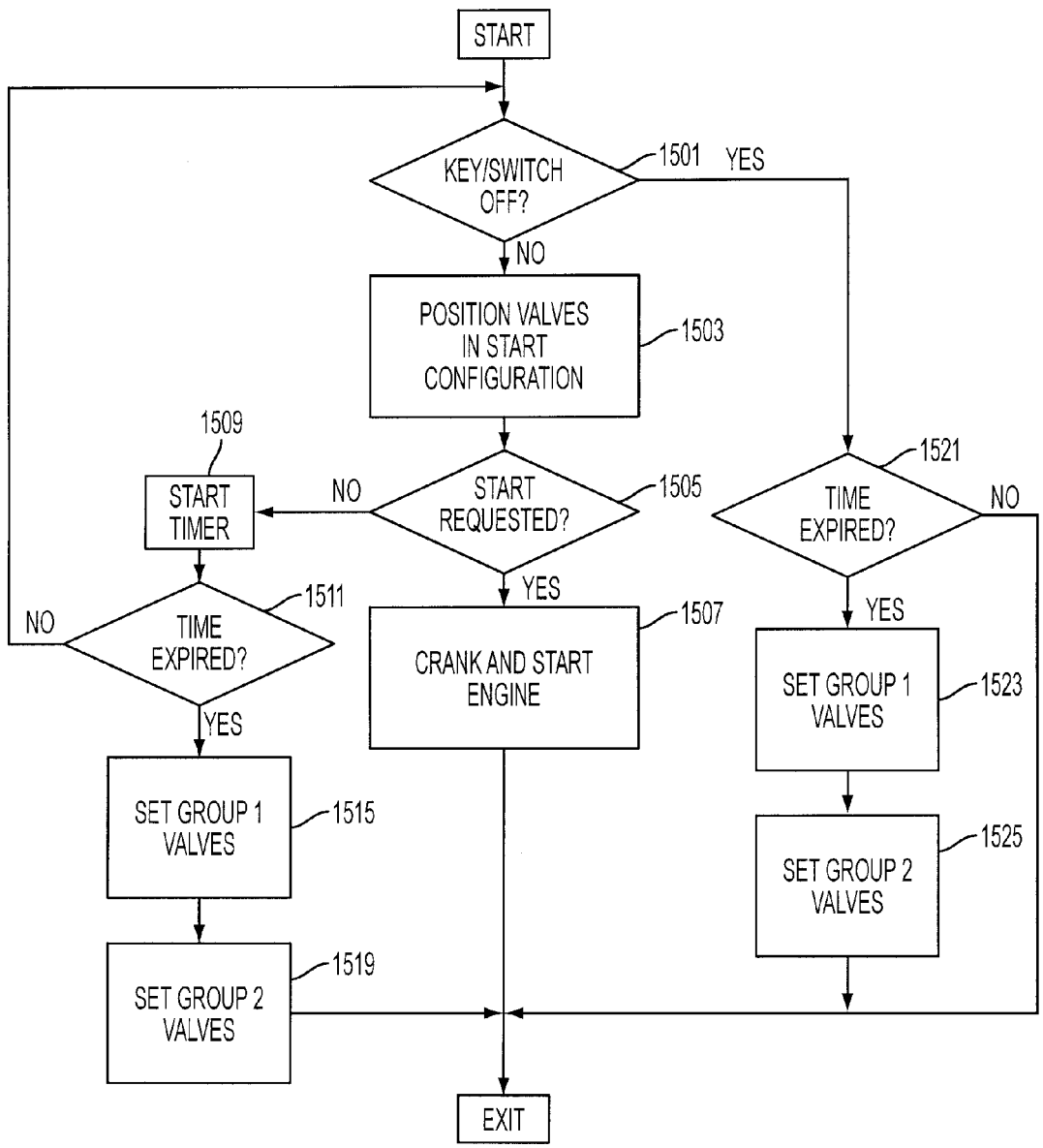
FIG. 15 is an example flow chart of valve control while a vehicle is transitioned in "accessory" mode.
Figure 16:
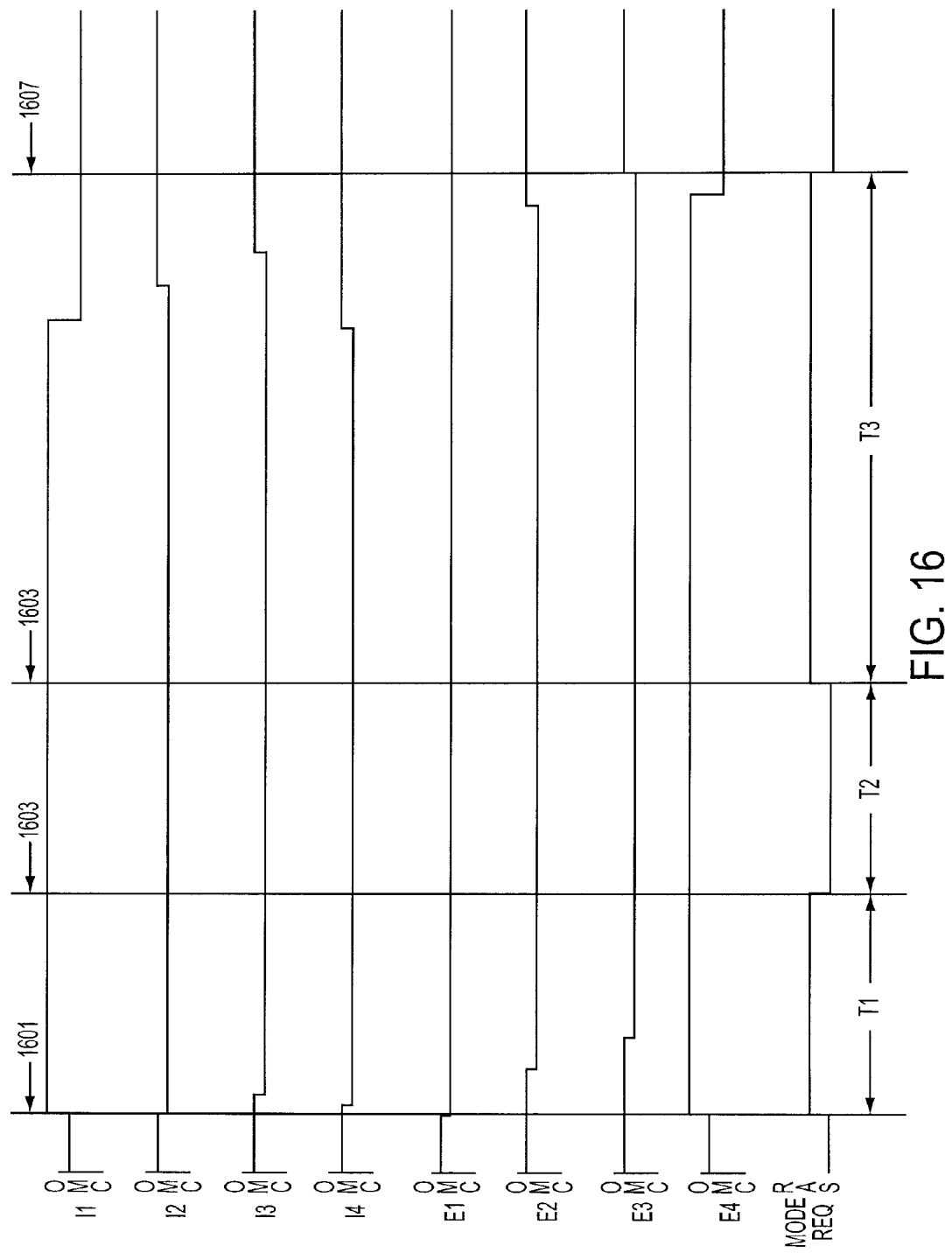
FIG. 16 is an example plot of valve positions of interest for a vehicle that transitions between stop mode and "accessory" mode.

Referring now to FIG. 15, a flow chart of a method to control valves when an engine is stopped is shown. As described above, some variably actuated valves may be operated with little regard to the position of an engine crankshaft, especially when the engine is stopped. However, some valves require power to remain in an open or closed position since springs used in this type of actuator tend to suspend the cylinder valve in a neutral open position. Consequently, this valve type may be left in the neutral position when the engine is stopped so that electrical power consumption may be lowered. When an operator requests engine operation, the valve position may be altered so that the engine can breathe and be started in accordance with a standard four stroke cycle, for example. However, it is also possible that an operator simply intends to operate engine accessories (e.g., a radio or entertainment center) without operating the engine. Further, some people tend to cycle from engine "off" to "accessory on" a number of times with no present desire to start the engine. The flow chart illustrated in FIG. 15 describes a method to mitigate the affect of this type of operator behavior while FIG. 16 illustrates an example valve sequence produced by the method of FIG. 15 during these conditions.

In step 1501, the engine or valve controller determines the operator's desire to start the engine by interrogating the status of an ignition key switch or from another switch that may be read such as a door open switch or a door lock switch, for example. If the key/switch/input is in the off position the routine exits. If the key/switch/input is in the on (i.e., accessory) or in the start position then the routine proceeds to step 1503.

In step 1503, the valves are pre-positioned in anticipation of a start request. This is the "ready-to-start" state of the engine. The valves may be positioned based on a four stroke engine cycle and the present engine position or they may be positioned so that the engine can start in another manner, 2-stroke direct start (i.e., starter-less) for example. Each valve may be positioned at a predetermined time independent of other valves or groups of valves (i.e., greater than one valve) may be positioned at times independent of other valve groups. The routine proceeds to step 1505.

In step 1505, the engine controller determines if there is a request to start the engine. If so, the routine proceeds to 1507, otherwise the routine moves to step 1509. Thus, after the valves are pre-positioned the engine may be started or the valves may be moved to another position, depending on operating conditions.

In step 1509, a timer is started. The timer is used to determine how long the valves are to be powered. The timer can be set to expire at a predetermined time that can vary with vehicle operating conditions (e.g., state of battery charge, the amount of battery power being consumed, ambient air temp, engine temp, the amount of current being drawn by a valve actuator). Further, the timer can be reset each time the operator toggles the key/switch/input from an off to on position. In an alternate embodiment, the timer can continue to run until the time expires, even if the operator toggles the key a number of times, such that the timer expires whether the key has been toggled or not. If the timer has expired and the key is toggled from "stop" to "accessories", or from "accessories" to "stop" after the timer has expired. Then the valves can then again be pre-positioned to the engine start position. The routine proceeds to step 1511 after the timer has been started.

In step 1511, the routine checks to see if the timer of step 1509 has exceeded a predetermined duration. The duration may change with operating conditions such as the temperature of the engine, ambient air temperature, battery state of charge, or time since the last engine start, for example. If the time has not expired the routine proceeds to step 1505, otherwise the routine proceeds to step 1515.

In step 1515, a group of valves are set to a desired state. In one example, the valves may be released from an open or closed position so that they are positioned in the neutral state. In another embodiment, permanent magnets may be used so that the valves may be held in an open or closed position while they are not powered. The routine proceeds to step 1519.

In step 1519, a second group of valves are set to a desired state. The valves may be positioned as described in step 1515. In addition, it is possible to delay the interval between when group one valves are set and when group two valves are set. In this way, the noise and power required to set the valves and may be reduced.

Note that FIG. 15, steps 1515 and 1519, describe only two valve groups, but more or fewer valve groups may be set to a desired state without deviating from the scope or intent of the description. In addition, if the operator requests a start after the valves are released, but without repositioning the valves from the release position, then the valves are positioned and the engine is started.

Steps 1521-1525 operate similar to those of steps 1511-1519, but they cover a condition where the driver has keyed "off" after an "accessory on" condition. Further, it is possible that the driver makes a number of key/switch/input transitions before deciding not to start the car. If this were to occur, steps 1521-1525 permit the valves to reach a desired state, such as mid position.

In step 1507, the pre-positioned valves are operated in accordance with engine position so that the engine can be started. In other words, if the engine is cranked during a start the valves will move based on a four stroke cycle, for example. In an alternative embodiment, the pre-positioned valves may allow the engine to be started without a starter (i.e., directly started) using injected fuel and trapped cylinder air. However, if the timer from step 1509 has exceeded a predetermined value, causing valves to be released, and if there is a subsequent request to start, then the valves are repositioned so that the engine is prepared to start. The routine exits if the engine is started.

Referring now to FIG. 16, an example plot of valve positions for a vehicle that transitions between "off" or "stop mode" and "accessory" mode is shown. The illustrated sequence is similar to those shown in FIGS. 6-8 and uses the same designations for valves and valve positions, but in this sequence the engine position does not change and the requested engine mode is identified by the mode request (Mode Req) trace. The mode request trace is comprised of three states; Run (R), Accessories (A), and Stop (S) which are explained below.

A vehicle can have several control states. The first control state is engine stop where the engine is not operating and where vehicle and engine systems are set to states where power consumption (i.e., primarily battery power consumption) is low because the vehicle may not be operated for some time, two weeks for example. When an operator puts the engine/vehicle into the stop state it is unknown whether the vehicle/engine will remain in this state for a minute or a month. Consequently, the vehicle/engine system is often set to a low energy consumption state in this mode.

Another possible control state is the "accessory" mode where vehicle systems are brought to a ready-to-operate or to operating conditions, but where the engine is not operated. In some vehicles this is accomplished by the driver turning an ignition key to a position that lies between the start and stop position, for example. However, this state or a similar state may be entered by other means, by signals input from a hybrid powertrain controller for example. This state is often a precursor to starting the engine and therefore can be useful to set the state of engine valves so that the engine is prepared to start. However, in some circumstances it is possible that the driver or requestor does not actually request that the engine start, if he/she simply wishes to operate a radio for example.

Of course, there is also the operating mode where the engine may be started and operated. In this mode the operating engine can be used to propel the vehicle and to supply power to ancillary systems (e.g., radio, intake/exhaust valve controller, lights, etc.) so that the battery power is not consumed, or alternatively power may be supplied to ancillary systems by the battery and by the engine, for example. This mode may be identified by an operating engine while the ignition key is in the "on" or "accessory" position, for example.

It may be useful during transitions between "engine stop mode", "accessory mode", and "engine run mode" to have a method that controls the valves in a way that improves engine starting while reducing power consumption and/or engine emissions.

At vertical marker 1601 a switch or input instructs the engine controller that the driver or an alternate source has requested that engine/vehicle accessories be enabled. The change in requested state is identified by the change in signal level of the Mode Req signal. This example illustrates an electrically actuated valve being moved from a neutral state to open or closed positions that depend on a desired starting sequence, for example. Specifically, the intake valve for cylinder one of a four cylinder engine is set to an open position in anticipation of an intake event of cylinder one. The remaining cylinder intake valves are shown being moved to closed positions at times that vary so that the valve controller current demand may be reduced and so that valve noise may be reduced. The exhaust valve for cylinder four is set to an open state so that cylinders one through four are now configured to allow starting the engine in four stroke mode.

At vertical marker 1603 the mode request signal transitions from the "accessory" state to the "stop" state. The distance between marker 1601 and marker 1603 (T1) is not intended to imply any specific time duration and as such is not intended to limit the breadth or scope of the description. Rather, the time T1 in this illustration is used to show a time interval that has not exceeded the time expired interval of step 1511 from FIG. 15. Accordingly, the states of the valves are not changed after they are initially set from the accessory request at 1601.

Vertical marker 1605 is used to identify another change in the mode request signal. This time the signal is returned back to the "accessory" position. During the T3 interval valves are released from pre-positioning locations to the neutral state while power flow is cut to others that remain in the open or closed position thanks to force provided by permanent magnets acting on the valve armatures. The T3 interval illustrates some potential valve state changes that may result from the expiration of the timer in step 1511. Alternatively, the valves may be moved to the neutral position in response to an operating condition of the engine, a temperature of the engine coolant or of the catalyst for example.

Vertical marker 1607 shows the last mode request change of the sequence and indicates a move from "accessory mode" back to "stop mode". Since the valves are set to a low power consumption mode during the T3 interval, the mode request change at marker 1607 does not alter the state of the valves.

Thus, FIG. 16 illustrates that it is possible to prepare an engine for start by pre-positioning valves while in the "accessory mode" without having to continue to drain power from the battery to keep the engine in a ready state. Further, the operator can make more than one transition from "stop mode" to "accessory mode" without exposing the operator to valve noise every time the transition is made. Further still, it is possible to reduce power consumption if the operator leaves the vehicle in the "accessory mode" for an extended period of time.

Note that the logic of FIG. 15 may be made so that the timer is reset at each transition from "accessory mode" to "stop mode" or so that the timer in step 1509 is reset only after a predetermined amount of time has expired, for example.

The valve trajectories of FIG. 16 illustrate one example valve control sequence of the method described by FIG. 15. In addition, it is possible to extend this valve control to other types of variable event valvetrains, electro-hydraulically actuated valves for example.

Figure 17:
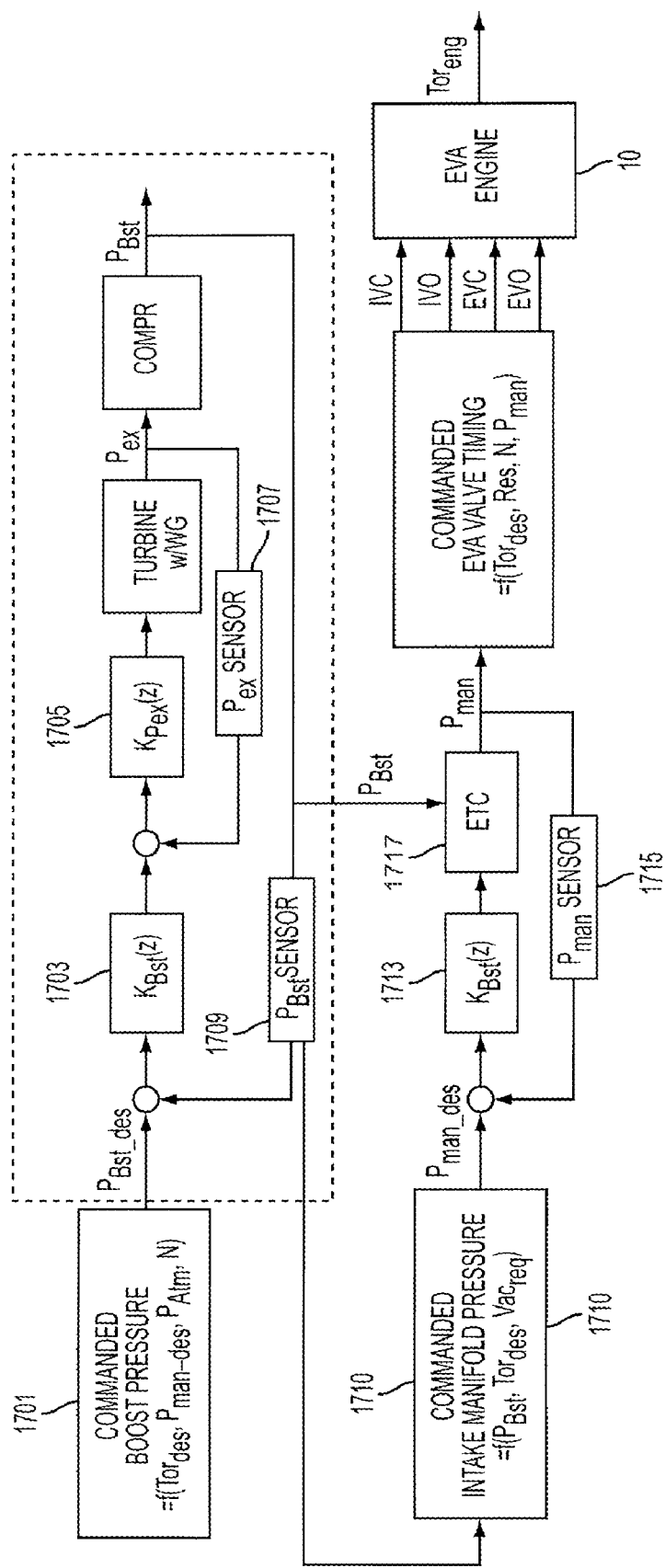
FIG. 17 is a block diagram of an example strategy to control a turbo charge engine having electrically actuated valves.

Referring now to FIG. 17, a flow chart of an example turbo charger control strategy for an engine having a variable event valvetrain is shown. Block 1701 represents the demanded boost pressure. The boost pressure is the pressure in the intake manifold between the compressor and the throttle body. The commanded boost is a function of the desired engine torque (Tor$_{des}$), engine speed (N), atmospheric pressure (P$_{atm}$), and the desired intake manifold pressure (P$_{man\_des}$). Where the desired engine torque is found from the sum of the operator requested brake torque, engine friction torque, and the engine accessory torque, for example. Engine brake torque can be determined from a pedal command, for example, while friction and accessory torques may be determined from empirical data that may be stored in tables and/or functions that may be related to engine speed, for example. Further, the commanded boost pressure may include compensation for the turbo charger compressor map, turbine characteristics, and engine pumping losses.

The commanded boost pressure minus the measured boost pressure is passed from the summing junction between blocks 1701 and 1703 to block 1703. This is a boost pressure error that control block 1703 operates on to compensate for differences between the desired and actual measured boost pressure. Block 1703 may provide boost pressure compensation based on a proportion of the boost error, a proportion and integration of the error, an estimate of system states that may be estimated from the boost demand and the boost feedback, or by using other known techniques. The term $K_{Bst}(z)$ is used to describe the control gain of this particular block and that the gain is based on a discrete system. Note that the gain of block 1703 may be linear, piecewise linear, and/or non-linear depending on control objectives and the magnitude of the boost pressure error. In other words, the boost gain may be set in a variety of ways to deliver the desired response.

The output of block 1703 is subtracted by the pressure from exhaust pressure symbolized by block 1707. The exhaust pressure may be directly measured or it may be inferred from engine speed, boost pressure, atmospheric pressure, air flow through the engine, and turbo charger vane or waste gate position, for example.

Controller gain block 1705 provides additional gain to the system in response to the output of the summer between blocks 1703 and 1705. The controller gain of block 1705 may be constructed by any of the methods mentioned above for block 1703. Gains of blocks 1703 and 1705 are selected to consider the desired response and desired stability of the system. The output of gain block 1705 is used to command the turbo charger vane or waste gate positioning device and can affect the output of the turbo charger compressor. The compressor boost pressure is monitored by a pressure sensor at block 1709 and provides an indication of the compressor flow rate.

The commanded intake manifold pressure is determined in block 1710. Intake manifold pressure can be determined by using tables or functions that are combined to output a manifold pressure that incorporates adjustments for engine noise, vacuum request of ancillary systems (e.g., brake boost), boost pressure, engine speed, desired torque, and engine volumetric efficiency, for example.

At block 1713 the difference between the desired intake manifold pressure P$_{man\_des}$ and the measured manifold pressure (block 1715) is operated on by a gain adjustment factor. The gain adjustment may be configured as any one of the types mentioned in the description of block 1703 and operates on electronic throttle controller (ETC) 1717. Of course, the position of the electronic throttle plate affects the intake manifold pressure and therefore can affect the timing of variable event valvetrain valves because the valve timing is dependant, in part, on intake manifold pressure. Therefore, the intake manifold pressure is used as a factor in determining valve timing. In one example, the valve timings may be determined as a function of the desired engine torque, intake manifold pressure, residuals (i.e., combusted air and fuel), and engine speed. Specifically, intake valve opening (IVO), exhaust valve closing (IVC), and exhaust valve opening (IVO) can be determine from empirically determined values that can be stored in tables that are indexed by engine speed and air flow through the engine. Intake valve closing may then be determined by calculating the cylinder volume at a given intake manifold pressure that corresponds to the desired cylinder air charge. That is, the intake valve closing location can then be determined to be the crankshaft angle where the intake valves are closed so that the cylinder volume at the prescribed valve closing yields the desired cylinder air charge. In addition, the desired cylinder air charge and therefore the valve timing can be adjusted at a rate that restricts the air flow through the engine to be less than or equal to the air flow through the compressor turbine at the time the valve adjustment is made. For additional description of a method to determine valve timings see the previously referenced U.S. patent application Ser. No. 10/805642, for example. The valves and throttle adjustments can change the inducted cylinder air amount and therefore may be used to adjust the engine torque.

Figure 18A:
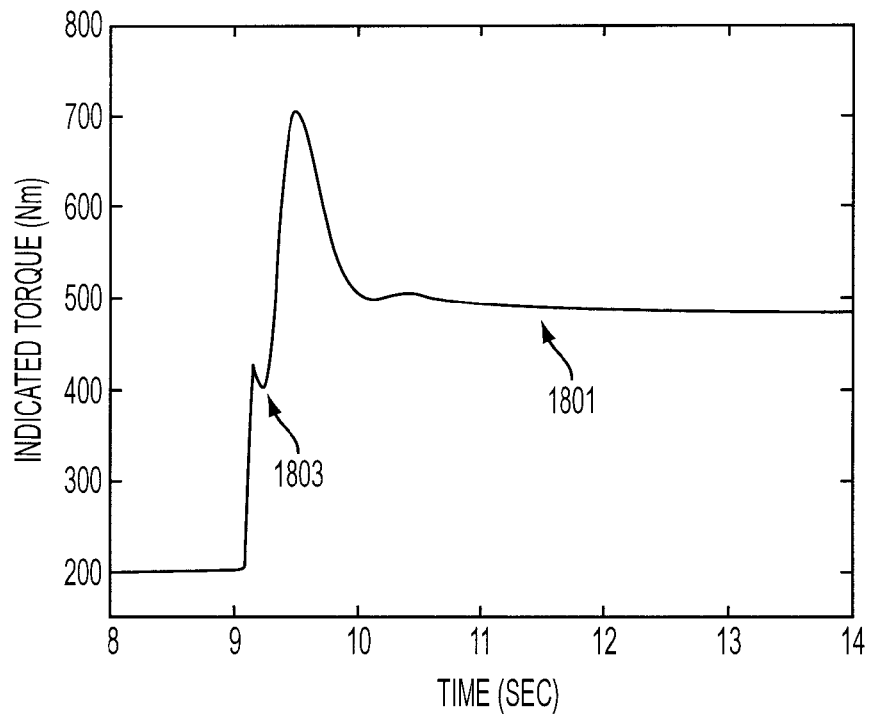
FIG. 18a is an example plot of signals of interest during an increasing torque request of a turbo charged engine having a variable event valvetrain.

Thus, FIG. 17 illustrates an example of a method to adjust engine valve timing for a turbo charge engine having a variable event valvetrain. The gains Referring now to FIG. 18a, a plot of signals of interest during an increasing torque request of a turbo charged engine having a variable event valvetrain is shown. Curve 1801 is a torque simulation response to a near step input torque demand request. The response is based on a system that uses boost pressure feedback and that allows intake valve timing to be adjusted to the limit of the valve actuator response. The engine torque response increases until location 1803 where it momentarily decreases and then increases again and then overshoots the desired torque. The torque sag at location 1803 and the overshoot of the desired torque can lead to drivability issues for the operator. In other words, the torque response of this system configuration may be felt by the driver and may therefore affect the pleasure of the driving experience.

Figure 18B:
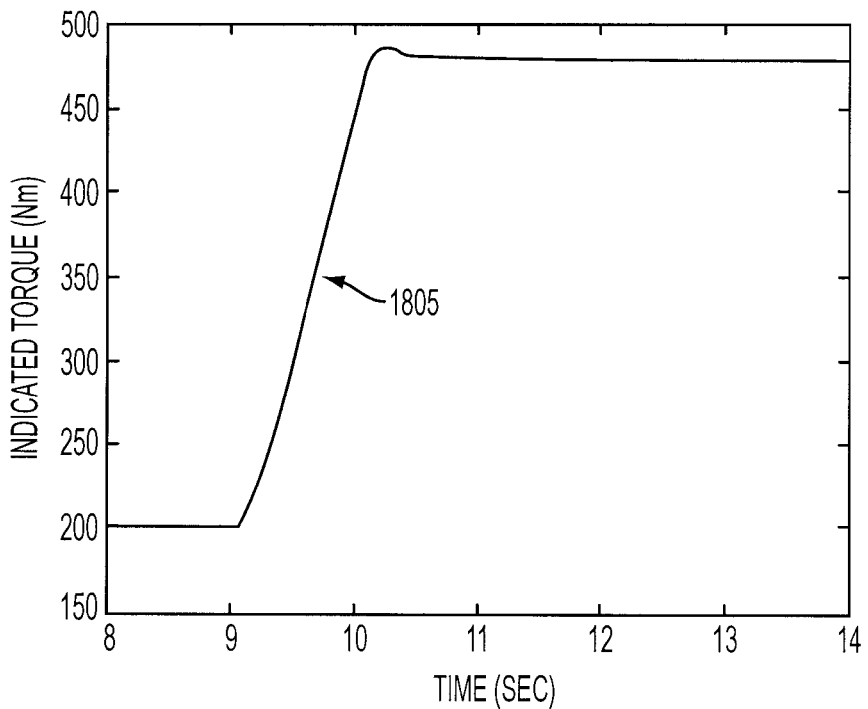
FIG. 18b is another example plot of signals of interest during an increasing torque request of a turbo charged engine having a variable event valvetrain.

Referring now to FIG. 18b, another plot of signals of interest during an increasing torque request of a turbo charged engine having a variable event valvetrain is shown. This plot is similar to the plot of FIG. 18a, but the torque response is improved by modifications to the torque control system as described in FIG. 17. Specifically, the torque response of curve 1805 increases monotonically from the change in the demand torque and the overshoot is also reduced. This torque response can reduce the variation of vehicle acceleration and may also improve the audible sound of the engine since the engine speed can also increase monotonically as the engine torque increases. In other words, the driver's perception of vehicle operation may be improved since the vehicle can accelerate in a steady manner. Further, transmission shifting may be improved because the engine accelerates in a predictable way and because shifts during an unexpected torque reduction may be avoided.

Figure 19:
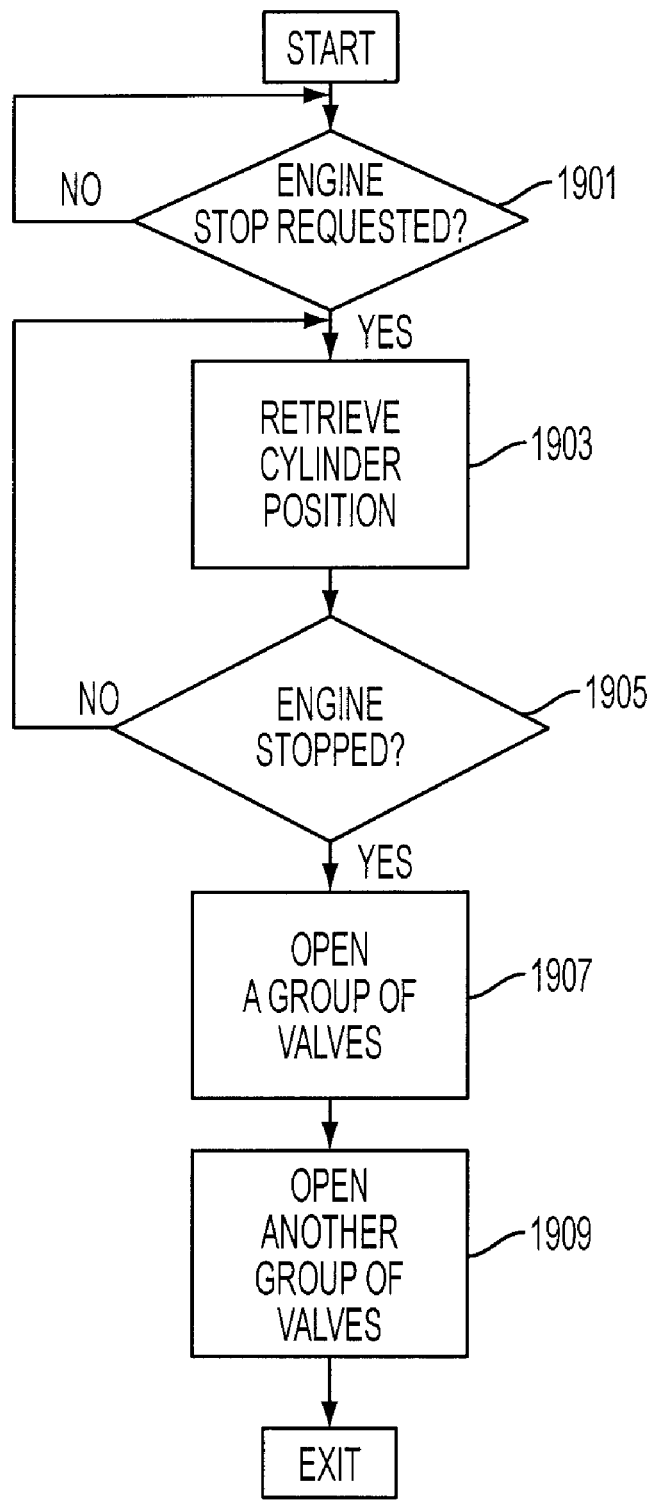
FIG. 19 is a flow chart of a valve release strategy during an engine stop.

Referring now to FIG. 19, a flow chart of an example valve release strategy during an engine stop is shown. In step 1901, the routine determines if an engine stop has been requested. As mentioned above, an engine stop request may be initiated by an operator or by another powertrain system, for example. If an engine stop has not be requested the routine exits. If an engine stop has been requested the routine proceeds to step 1903.

In step 1903, the routine evaluates a series of status registers that contain an indication of the current stroke of each cylinder (e.g., power stroke, combustion stroke, intake stroke, etc.) to determine the respective stroke each cylinder is on at the present engine stop position. The routine proceeds to step 1905.

In step 1905, the routine determines if the engine rotation has stopped. If so, the routine proceeds to step 1907, if not, the routine returns to step 1903.

In step 1907, a group of valves is opened at a controlled rate so that the pressure difference between the exhaust manifold and the cylinder or between the intake manifold and the cylinder is slowly reduced. Alternatively, where the valves are comprised of permanent magnets, power may be reduced to the valve at a controlled rate until power flow is stopped, thereby releasing the valve, although the position of a valve having permanent magnets may not change after valve release. Conversely, if the valve is in a full open position at engine stop the valve can be slowly released to the neutral position so that valve noise is reduced. Also, a valve group may be comprised of one or more valves and may be further comprised of different types of valves, intake or exhaust valves for example. Further still, a group of valves may be comprised of both intake and exhaust valves. Thus, valves may be opened or closed during an engine stop at rates and in sequences that are different than those used during running engine conditions.

The valves in a group may be released simultaneously or they may be released at individual times or a predetermined number of valves may be released at a predetermined time. Further, the valve release rate may be based on the pressure in a cylinder or in another embodiment the valve release rate may be based on the pressure in the cylinder. Note that cylinder pressure may be measured or estimated from the position of the piston in the cylinder and by the cylinder stroke. If the piston of a cylinder holding trapped exhaust gases stops at a location where the volume of the cylinder is one half of the available cylinder volume then the valve may be released at a first rate. On the other hand, if another cylinder contains a small air amount that is slightly pressurized then the valve operating in this cylinder may be released at a second rate, a rate higher or lower than the first rate, for example. Valve release rates are typically in units of millimeters per second. The routine proceeds to step 1909.

In step 1909, a second group of valves can be released. This group of valves may be released in any one of the previously mentioned ways depending on desired results. In addition, there may be a delay between releasing the first group of valves and releasing the second group of valves. The routine proceeds to exit.

Note that it may be necessary to first decrease current to the valve and then to increase current to the valve so that a desired valve position may be achieved during a valve release operation. This occurs because for the same amount of spring force additional current is required to hold valve in place as the distance increases from the face of the electro-magnet to the armature plate. Further, as mentioned above, a valve may be released by stopping current flow to the valve without the valve actually moving. This case may occur for valves that have permanent magnets that can balance the valve opening spring force.

Figure 20:
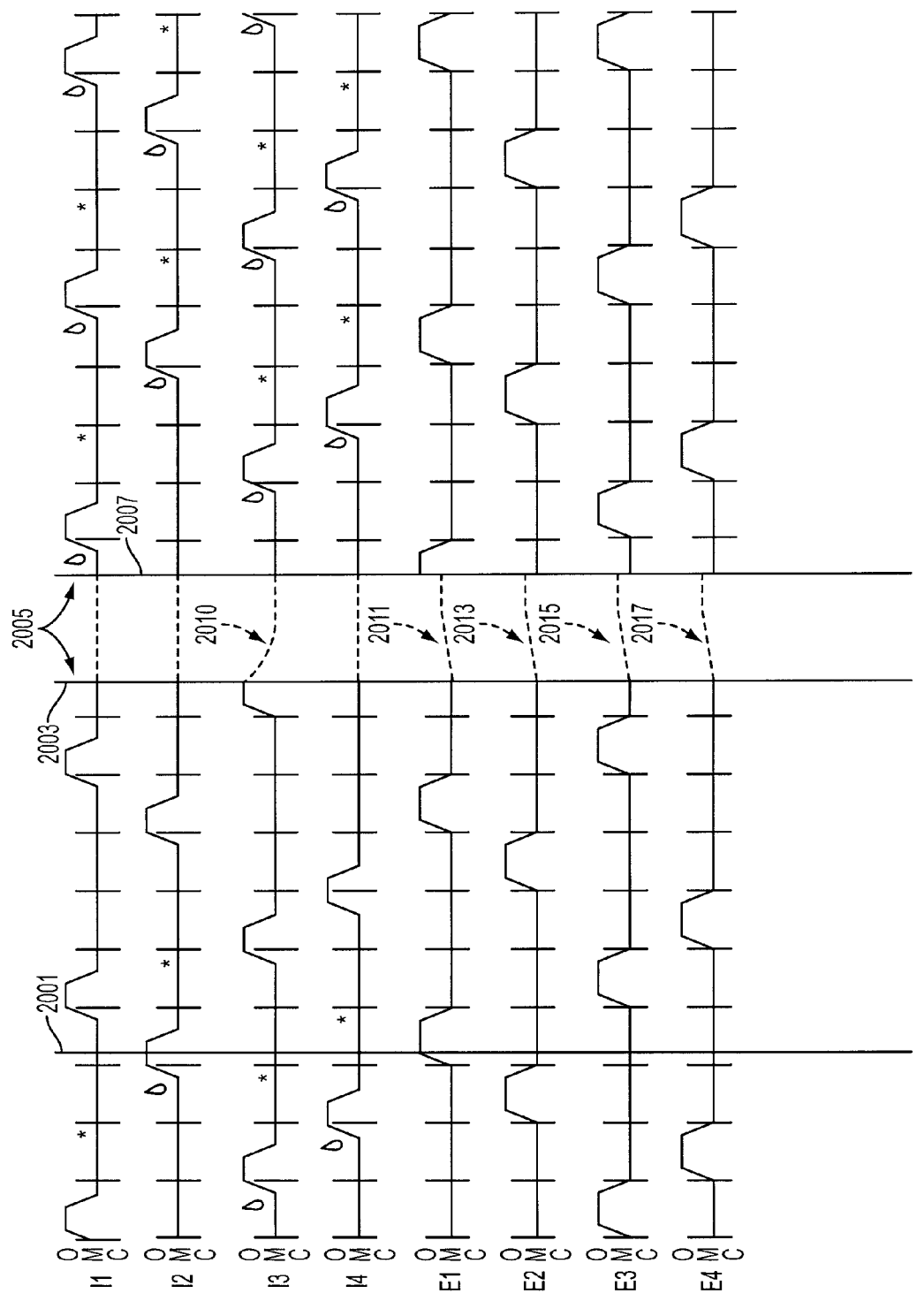
FIG. 20 is a plot of valve position during an example valve release at engine stop.

Referring now to FIG. 20, a plot of an example valve release at engine stop is shown. Intake and exhaust valve trajectories for a four cylinder engine are illustrated similar to those shown in FIGS. 6-8. At location 2001 a request to stop the engine is made. The engine may be stopped by stopping fuel flow to the cylinders. The intake and exhaust valves continue to operate in a four stroke manner, but valve operation may be altered after the request to stop so that engine emissions may be reduced, for example. Note as an alternative, the intake and/or exhaust valves may be controlled during an engine shutdown or start by any of the above mentioned methods or by a method described in any of the incorporated by references.

The engine reaches a stop at location 2003. The engine remains stopped in region 2005 until it is restarted at location 2007. The stop duration may vary in length of time and as such the duration illustrated in FIG. 20 is not meant to limit the breadth or scope of the description. In addition, it is also possible to begin releasing the valves any time after the request to stop the engine has occurred. For example, valves may be released after an engine stop request at a predetermined time, after a predetermined amount of engine rotation, or at a predetermined amount of time after the engine has stopped rotating.

In FIG. 20, the intake valve of cylinder three is in an open position at engine stop. The figure shows that the valve trajectory moves at a controlled rate from the open position to the closed position. This example trajectory can reduce the amount of valve noise since the valve has fewer tendencies to bounce between magnets at engine stop. The figure shows exhaust constituents of cylinder three, from a prior combustion event, being released prior to opening the intake valve so the intake valve of cylinder three may be released with less concern of releasing exhaust gas into the intake manifold. The exhaust valves for cylinders one through four are released at locations 2011, 2013, 2015, and 2017. The intake valve for cylinder number three is released at 2010. Cylinder one and cylinder two exhaust valves begin movement toward the neutral position at substantially the same time and at substantially the same rate. Cylinders three and four exhaust valves begin movement shortly after engine stop and at a different rate than the exhaust valves of cylinders one and two. Thus, the figure shows different valves being released at different times, at different release rates (i.e., the rate at which the valve opens, 0.1 mm/sec for example), and with different groups of valves. By staggering the valve release time along with the valve release rate it is possible to reduce the valve noise as well as noise from gases escaping or entering the cylinders. Further, by slowly releasing valves at different times the instantaneous current draw may be reduced. Further still, selected valves can be released based on the contents of the cylinder and/or the position of the piston in the cylinder so that the cylinder contents are released to the manifold suited for the cylinder contents. For example, it is possible to intake an air-fuel mixture, combust the mixture, and then be at an engine stop position where the mixture is pressurized and trapped in the cylinder. In this condition the contents of the cylinder can be released to the exhaust manifold at a controlled rate so that the exhaust constituents are at least partially converted by the warm catalyst, thereby reducing engine emissions. On the other hand, for a cylinder that has inducted an air charge but that has not combusted it may be desirable to exhaust the cylinder contents to the intake manifold so that the fresh air does not cool the exhaust catalyst, for example.

As will be appreciated by one of ordinary skill in the art, the routines described in FIGS. 4-5, 9-12, 15, and 19 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
in response to a torque request, limiting an adjustment rate of engine intake valves to restrict engine air flow to equal turbocharger air flow; and
in response to the torque request where valve actuator degradation is present, operating engine intake valves at a fixed timing and restricting engine air flow to equal turbocharger air flow.

2. The method of claim 1, wherein a throttle is located in an intake system upstream of said intake valves, and where engine air flow during valve actuator degradation is adjusted via adjusting a position of the throttle.

3. The method of claim 2, wherein said throttle is an electrically controlled throttle.

4. The method of claim 1, wherein said torque request increases from a lower value to a higher value.

5. The method of claim 1, wherein said intake valve is an electrically actuated valve.

6. A method, comprising:
adjusting intake valves downstream of a throttle to vary engine air flows as air flowing through a turbocharger varies, and
during valve actuator degradation, operating the intake valves with a fixed timing and limiting engine air flow to equal air flow through the turbocharger via adjusting the throttle, and opening vanes of the turbocharger in response to an increasing engine torque request for a predetermined duration.

7. The method of claim 6, wherein said throttle is an electrically controlled throttle, and wherein vanes of the turbocharger are closed after the predetermined duration.

8. The method of claim 7, wherein the predetermined duration is a predetermined amount of time.

9. The method of claim 6, wherein said intake valves are electrically actuated valves, and wherein the fixed timing is relative to a crankshaft.

10. The method of claim 6, wherein a waste gate or vane is adjusted to change an output of said turbocharger.

11. A method, comprising:
reactivating a group of deactivated cylinders in response to an increasing engine torque request;
opening vanes of a turbocharger in response to the increasing engine torque request for a predetermined duration;
closing vanes of the turbocharger after the predetermined duration;
adjusting intake valves downstream of a throttle to vary an air charge of cylinders as air flowing out of the turbo charger varies, and
during the increasing engine torque request, limiting an adjustment rate of said intake valves to limit air flow through said cylinders to less than or equal to air flowing out of said turbocharger.

12. The method of claim 11, wherein said throttle is an electrically controlled throttle, and wherein the predetermined duration is a predetermined amount of time.

13. The method of claim 11, wherein said adjustment rate is further related to a desired torque, and where the predetermined duration is a predetermined number of cylinder combustion events.

14. The method of claim 11, wherein said intake valves are electrically actuated valves.

15. The method of claim 11, further comprising wherein vanes of the turbocharger are adjusted to change an output of said turbocharger compressor.

* * * * *